US009487923B2

(12) United States Patent
Masanek, Jr. et al.

(10) Patent No.: US 9,487,923 B2
(45) Date of Patent: Nov. 8, 2016

(54) FLOOR TILE

(71) Applicant: MacNeil IP LLC, Bolingbrook, IL (US)

(72) Inventors: Frederick W. Masanek, Jr., Barrington, IL (US); David S. Iverson, Hinsdale, IL (US); Allan R. Thom, Clarendon Hills, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 78 days.

(21) Appl. No.: 14/017,425

(22) Filed: Sep. 4, 2013

(65) Prior Publication Data

US 2014/0023824 A1    Jan. 23, 2014

Related U.S. Application Data

(63) Continuation of application No. 12/609,959, filed on Oct. 30, 2009, now Pat. No. 8,535,785.

(51) Int. Cl.
*B32B 3/02* (2006.01)
*B32B 3/24* (2006.01)
*B32B 7/04* (2006.01)
(Continued)

(52) U.S. Cl.
CPC .............. *E01C 5/20* (2013.01); *E01C 5/226* (2013.01); *E01C 13/045* (2013.01); *E04F 15/02194* (2013.01); *E04F 15/105* (2013.01); *B29C 45/14* (2013.01); *B29C 45/16* (2013.01); *B32B 3/266* (2013.01); *B32B 7/04* (2013.01); *E01C 2201/12* (2013.01); *E01C 2201/16* (2013.01); *Y10T 428/24322* (2015.01); *Y10T 428/24331* (2015.01); *Y10T 428/24339* (2015.01); *Y10T 428/24347* (2015.01); *Y10T 428/24612* (2015.01); *Y10T 428/24752* (2015.01); *Y10T 428/24777* (2015.01); *Y10T 428/24802* (2015.01); *Y10T 428/24942* (2015.01); *Y10T 428/24983* (2015.01)

(58) Field of Classification Search
None
See application file for complete search history.

(56) References Cited

U.S. PATENT DOCUMENTS

| | | |
|---|---|---|
| 348,782 A | 9/1886 | Sawyer |
| 1,925,271 A | 9/1933 | Miller |

(Continued)

FOREIGN PATENT DOCUMENTS

| | | | | |
|---|---|---|---|---|
| DE | 3505409 A1 | * | 8/1986 | ............... B60R 7/04 |
| DE | 19910649 A1 | * | 9/2000 | ........... A47L 23/266 |

(Continued)

OTHER PUBLICATIONS

English Abstract for JP 59007027 A, Jul. 1982.*

(Continued)

*Primary Examiner* — Jeff Vonch
(74) *Attorney, Agent, or Firm* — Perkins IP Law Group LLC; Jefferson Perkins

(57) ABSTRACT

A modular plastic floor tile has a body of a first polymer compound and features overmolded onto the body from a second polymer compound. The compounds may be different from each other in hardness and/or color. The features may include raised pads on the upper surface and/or skins on support member cores downwardly depending from the tile lower surface. The pads on the upper surface may be injection-molded from the lower surface through through-holes. Lateral edges of the tile are provided with latches which fit into loops with an interference fit. The loops flex in order to impose a compressive force on mating tile edges. The tile may have an overmolded peripheral seal.

11 Claims, 17 Drawing Sheets

(51) Int. Cl.
| | |
|---|---|
| *E04F 15/02* | (2006.01) |
| *E04F 15/10* | (2006.01) |
| *E01C 5/20* | (2006.01) |
| *E01C 5/22* | (2006.01) |
| *E01C 13/04* | (2006.01) |
| *B29C 45/14* | (2006.01) |
| *B29C 45/16* | (2006.01) |
| *B32B 3/26* | (2006.01) |

(56) References Cited

U.S. PATENT DOCUMENTS

| | | |
|---|---|---|
| 3,354,249 A | 11/1967 | Morin |
| 3,699,926 A | 10/1972 | Stockl |
| 3,909,996 A | 10/1975 | Ettlinger, Jr. et al. |
| 3,946,529 A | 3/1976 | Chevaux |
| 4,054,987 A | 10/1977 | Forlenza |
| 4,111,585 A | 9/1978 | Mascaro |
| 4,167,599 A | 9/1979 | Nissinen |
| 4,169,339 A | 10/1979 | See |
| 4,436,779 A | 3/1984 | Menconi et al. |
| 4,491,556 A * | 1/1985 | Fujii et al. ........ 264/243 |
| 4,590,731 A | 5/1986 | DeGooyer |
| 4,663,903 A | 5/1987 | Ellingson, Jr. |
| 4,810,559 A | 3/1989 | Fortier et al. |
| 4,860,510 A | 8/1989 | Kotler |
| 4,930,286 A | 6/1990 | Kotler |
| 5,171,619 A | 12/1992 | Reuben |
| 5,228,253 A | 7/1993 | Wattelez |
| 5,364,204 A | 11/1994 | MacLeod |
| 5,628,160 A | 5/1997 | Kung |
| 5,950,378 A | 9/1999 | Council et al. |
| 5,992,106 A | 11/1999 | Carling et al. |
| 6,098,354 A | 8/2000 | Skandis |
| 6,221,298 B1 | 4/2001 | Ferreira et al. |
| 6,233,776 B1 | 5/2001 | Blum et al. |
| 6,264,869 B1 | 7/2001 | Notarpietro et al. |
| 6,372,323 B1 | 4/2002 | Kobe et al. |
| 6,451,400 B1 | 9/2002 | Brock et al. |
| 6,467,224 B1 | 10/2002 | Bertolini |
| 6,531,203 B2 | 3/2003 | Kessler et al. |
| 6,562,271 B2 | 5/2003 | Hiraoka et al. |
| 6,564,397 B1 | 5/2003 | Hawley et al. |
| 6,622,440 B2 | 9/2003 | Mercade |
| 6,623,840 B2 | 9/2003 | Hainbach |
| 6,751,912 B2 | 6/2004 | Stegner et al. |
| 6,802,159 B1 | 10/2004 | Kotler |
| 6,926,856 B2 | 8/2005 | Hus et al. |
| 6,966,155 B2 | 11/2005 | Nevison |
| 6,969,548 B1 | 11/2005 | Goldfine |
| 7,001,101 B1 | 2/2006 | DeRose |
| 7,114,298 B2 | 10/2006 | Kotler |
| 7,291,378 B2 | 11/2007 | Cowelchuk et al. |
| 7,299,592 B2 | 11/2007 | Moller, Jr. |
| 7,507,362 B2 | 3/2009 | Moller, Jr. |
| 7,517,483 B2 | 4/2009 | Dalla Valle |
| 7,543,417 B2 | 6/2009 | McIntosh et al. |
| 7,571,572 B2 | 8/2009 | Moller, Jr. |
| 7,571,573 B2 | 8/2009 | Moller, Jr. |
| 7,587,865 B2 | 9/2009 | Moller, Jr. |
| 7,610,731 B1 | 11/2009 | Collison |
| 7,636,960 B2 | 12/2009 | Hawley et al. |
| 7,757,449 B2 | 7/2010 | Portoles Ibanez et al. |
| 7,793,471 B2 | 9/2010 | Hill |
| 7,908,802 B2 | 3/2011 | Frederiksen |
| 7,918,057 B2 | 4/2011 | Moller, Jr. |
| 8,037,648 B2 | 10/2011 | Vanderhoef |
| 8,166,722 B2 | 5/2012 | Moller, Jr. |
| 8,230,654 B2 | 7/2012 | McIntosh et al. |
| 8,266,857 B2 | 9/2012 | David |
| 8,341,896 B2 | 1/2013 | Moller, Jr. et al. |
| 8,397,466 B2 | 3/2013 | Jenkins et al. |
| 8,407,951 B2 | 4/2013 | Haney et al. |
| 8,439,596 B1 | 5/2013 | Dvoracek |
| 8,458,974 B2 | 6/2013 | McIntosh et al. |
| 8,658,269 B1 | 2/2014 | Parkes et al. |
| 8,782,989 B2 | 7/2014 | Tang |
| 2002/0124506 A1 | 9/2002 | Mercade |
| 2003/0044591 A1 | 3/2003 | Hsieh |
| 2004/0226241 A1 | 11/2004 | Forster et al. |
| 2004/0226244 A1 | 11/2004 | Graab et al. |
| 2004/0258869 A1 | 12/2004 | Walker |
| 2005/0016097 A1 | 1/2005 | Janesky |
| 2005/0183370 A1 | 8/2005 | Cripps |
| 2005/0193669 A1 | 9/2005 | Jenkins et al. |
| 2005/0252109 A1 | 11/2005 | Fuccella et al. |
| 2006/0016136 A1 | 1/2006 | Moller, Jr. |
| 2006/0070314 A1 | 4/2006 | Jenkins et al. |
| 2006/0127647 A1 | 6/2006 | Thrush |
| 2006/0185287 A1 | 8/2006 | Glazer et al. |
| 2006/0272252 A1 | 12/2006 | Moller, Jr. |
| 2006/0283118 A1 | 12/2006 | Moller, Jr. |
| 2007/0184248 A1 | 8/2007 | Pai |
| 2008/0118703 A1 | 5/2008 | Sansano Marti |
| 2008/0127593 A1 | 6/2008 | Janesky |
| 2008/0229625 A1 | 9/2008 | Frasson et al. |
| 2008/0229697 A1 | 9/2008 | Bosman et al. |
| 2009/0031658 A1 | 2/2009 | Moller, Jr. et al. |
| 2009/0047451 A1 | 2/2009 | Huss et al. |
| 2009/0139159 A1 | 6/2009 | Hill |
| 2009/0139160 A1 | 6/2009 | Hill |
| 2009/0266019 A1 | 10/2009 | McIntosh et al. |
| 2009/0282769 A1 | 11/2009 | Moller, Jr. |
| 2010/0005757 A1 | 1/2010 | Collison |
| 2010/0021718 A1 | 1/2010 | Vos et al. |
| 2010/0236176 A1 | 9/2010 | Jenkins et al. |
| 2011/0056158 A1 | 3/2011 | Moller, Jr. et al. |
| 2011/0076457 A1 | 3/2011 | Reichwein et al. |
| 2011/0104434 A1 | 5/2011 | Masanek, Jr. et al. |
| 2012/0085043 A1 | 4/2012 | Jenkins et al. |
| 2013/0047528 A1 | 2/2013 | Masanek, Jr. et al. |
| 2013/0086861 A1 | 4/2013 | Masanek, Jr. et al. |
| 2013/0093115 A1 | 4/2013 | Masanek, Jr. et al. |
| 2013/0093116 A1 | 4/2013 | Masanek, Jr. et al. |
| 2013/0095291 A1 | 4/2013 | Masanek, Jr. et al. |
| 2013/0095295 A1 | 4/2013 | Masanek, Jr. et al. |
| 2013/0111836 A1 | 5/2013 | Masanek, Jr. et al. |
| 2013/0136899 A1 | 5/2013 | Milella, Jr. et al. |
| 2013/0180195 A1 | 7/2013 | Moller, Jr. et al. |

FOREIGN PATENT DOCUMENTS

| | | |
|---|---|---|
| EP | 1077297 A2 | 2/2001 |
| EP | 1418290 A1 | 12/2004 |
| EP | 1514498 A1 | 3/2005 |
| JP | S54-79715 U | 6/1979 |
| JP | 59007027 A | 1/1984 |
| JP | 218046 A | 1/1990 |
| JP | H6-71715 U | 10/1994 |
| JP | 9-32247 A | 2/1997 |
| JP | 09165897 A | 6/1997 |
| JP | 11-152882 A | 6/1999 |
| JP | 2004-188100 A | 7/2004 |
| JP | 2009108579 A | 5/2009 |
| KR | 10-2006-0005296 A | 1/2006 |
| KR | 20060005296 A | 1/2006 |
| WO | 2011053710 A1 | 5/2011 |

OTHER PUBLICATIONS

Machine Translation of EP 1077297 A2, Feb. 2001.*
Machine Translation of DE 3505409 A1, Aug. 1986.*
United States Patent and Trademark Office Acting as ISA, International Search Report and Written Opinion of the ISA issued in connection with International Application No. PCT/US2010/054515 on Feb. 18, 2011.
US Patent and Trademark Office Acting as The International Searching Authority, International Preliminary Report on Patentability issued in connection with International Patent Application No. PCT/US10/54515, May 1, 2012.

(56) References Cited

OTHER PUBLICATIONS

US Patent and Trademark Office Acting as The International Searching Authority, International Search Report issued in connection with International Patent Application No. PCT/US2012/051609 on Nov. 2, 2012.

European Patent Office, Extended European Search Report issued on Jul. 31, 2014 in connection with European Patent Application No. 10827475.4.

Japanese Patent Office, Notification of Reasons of Refusal issued for Japanese Patent Application No. 2012-537069 on Jun. 24, 2014.

Japanese Patent Office, Notification of Reasons of Refusal issued for Japanese Patent Application No. 2012-154195 on Jun. 24, 2014.

* cited by examiner

FLOOR TILE

RELATED APPLICATIONS

This application is a continuation of U.S. patent application Ser. No. 12/609,959, filed Oct. 30, 2009, assigned to the assignee hereof and the specification and drawings of which are fully incorporated by reference herein.

BACKGROUND OF THE INVENTION

Conventional modular injection-molded tiles are known in the art for laying across upper surfaces of garage floors, sports surfaces, outdoor surfaces and other substrates. These tiles typically are twelve to thirteen inches square and can be manually assembled and disassembled. A common feature of these tiles is their ability to be snapped together, with few or no tools, using male and female connectors molded into each tile for the purpose.

Conventional single tiles are molded to be a single, uniform color such as all-black or all-red. The consumer typically can choose different tiles in different colors. The consumer or contractor will often choose two or more colors for a particular floor, for assembly into an aesthetically pleasing pattern. But manufacturing an injection-molded plastic tile that has two or more perceptible colors per tile is more difficult and to date no such tile has been provided that has proven to be acceptable to the consumer.

Many conventional modular plastic tiles are easily dislodged from their positions on the floor (particularly where wheeled vehicles are driven onto and off of them) and require a rubber sheet or the like as a substrate. It would therefore be advantageous to furnish a floor tile, for applications in which a large displacing lateral force may be applied to the tile, and which does not require a nonslip sheet as a substrate.

Previous attempts have been made to produce plastic modular tiles that have cushioning characteristics. US Patent Application Publication No. US 2009/0031658 A1 discloses modular athletic floor tiles that have a plurality of premolded rubber inserts which, after molding, are physically inserted into receiving holes in a molded plastic substrate. In one embodiment each rubber insert has a face that is stands up from the surrounding top floor surface. The body of each rubber insert extends all the way through the plastic substrate or base and well below its bottom. The rubber inserts are selectively compressed when an athlete stands on them, giving a cushioning effect. But it is believed that the separate molding of these inserts, flash removal from them and physical insertion of them into respective receiving holes in the plastic tile substrate is time-consumptive and greatly increases the cost of manufacture of the resultant tile.

A need therefore persists in the industry for modular plastic tiles which can sustain heavy loads but yet have non-slip characteristics, which will be effectively joined together, which can be provided in a plurality of colors per tile, and which can be manufactured quickly and inexpensively.

SUMMARY OF THE INVENTION

According to one aspect of the invention, a modular floor tile is provided which may be used to create a flooring surface including a plurality of like tiles. A first polymer compound is used to mold a body of the tile. The body has a plurality of through-holes which extend from its upper surface to a general lower surface. A second polymer compound, whose hardness (when solidified) and/or color are different from the first, is used to mold at least one pad to be disposed on the upper surface of the body, and is also used to form at least a portion of a support member which downwardly depends from the body's general lower surface. The portion of the support member and the pad on the body's upper surface are molded in a continuous phase and communicate to each other through the through-holes. Preferably, the tile has many such pads on its upper surface, and many such support members downwardly depending from its lower surface. Groups of these pads and support member portions are molded together in a continuous phase of the second polymer compound.

In another aspect of the invention, a modular floor tile having a body molded from a relatively rigid first polymer compound includes a plurality of support member cores each downwardly depending from a general lower surface of the body. A skin molded from a second polymer compound which is softer (when solidified) than the first polymer compound adheres to at least some of the bottom and sides of the support member cores. Preferably, the cores are laterally spaced apart from each other. In one embodiment groups of the support members have their skins joined together in a continuous phase.

In a further aspect of the invention, a modular tile body is molded from a first polymer compound. A plurality of raised pads is overmolded onto an upper surface of the body using a second polymer compound that is different from the first polymer compound. Each of the raised pads is laterally surrounded by a crush ring which presents a smooth surface and which is elevated with respect to a general upper surface of the body. The crush rings prevent the second polymer compound from flashing.

In a further related aspect of the invention, a modular tile body is molded from a first polymer compound to include a horizontal web and a portion of at least one support member formed to downwardly depend from a general lower surface of the web. A crush pad is formed as a portion of the lower surface of the web to be laterally adjacent to and to surround the support member. The crush pad has a smooth, horizontal surface which is disposed to be lower than the general lower surface of the web. The support member is completed by overmolding with a second polymer compound which, when solidified, is softer than the solidified first polymer compound. The crush pad is used to shut off the second polymer compound so as to prevent flashing of the second polymer compound.

In another aspect of the invention, a modular floor tile, provided for use in a flooring surface constituted by a plurality of such tiles, has a body with a horizontal web molded from a first polymer compound. A second polymer compound, which when solidified is more elastomeric than the solidified first polymer compound, is overmolded on the lateral edges of the horizontal web to create a peripheral seal. Preferably the seal occupies a step in the lateral edges.

In yet another aspect of the invention, a modular floor tile is provided for use in creating a flooring surface of such tiles, including first and second ones of such tiles. The tile body is molded from a polymer compound and has a substantially planar, horizontal web. The web has a plurality of edge surfaces including first and second edge surfaces which are complementary to each other, such that a first edge surface of a first tile will mate with a second edge surface of a second tile. The edge surfaces can, but don't have to be, orthogonal to the upper and lower surfaces of the horizontal web and can, but don't have to be, planar.

Each first edge surface has associated therewith at least one latch which downwardly depends from a general lower surface of the web. The latch has a laterally inward facing surface that is laterally inwardly displaced from the first edge surface. A point on the inward facing surface is disposed at a predetermined innermost limit. Each second edge surface has associated therewith at least one loop that extends laterally outwardly beyond the second edge surface. An inner loop surface of the loop includes a point at an outermost limit thereof. When first and second tiles are joined together, a latch of the first tile is received into a loop of the second tile. An interference between the innermost limit of the inward facing surface of the latch and the outermost limit of the inner loop surface will cause the loop to elastically flex, thereby biasing together the first edge surface of the first tile and the second edge surface of the second tile.

Preferably, the inward facing surface of the latch is laterally inwardly convex and the inner surface of the loop is concave. More preferably the degree of convexity of the latch is greater than the degree of concavity of the loop, such that the degree of interference along a length of the loop will be nonlinear. There will be more interference at the outermost limit of the loop inner surface (preferably in about the middle of its length), and a decrease in interference as a function of displacement along this surface from the outermost limit. This nonlinear interference reduces stress on the attachment points of the loop to the body and mitigates loop failure.

In a further aspect of the invention, a method of forming a plastic modular floor tile includes molding a body of a first polymer compound which is relatively rigid when solidified, and then overmolding a plurality of pads onto the upper surface of the body from a second polymer compound that, when solidified, is not as rigid as the first. Preferably, through-holes are provided in the body to extend from an upper surface to a lower surface thereof, and the second polymer compound is injected to a point adjacent the lower surface of the body, flows through the through-holes, and creates each of a group of pads on the upper surface. More preferably runners connect a common fill point to a group of such through-holes, which preferably are provided one per pad. In an alternative embodiment the second polymer compound is injected to a point adjacent the upper surface of the body, flows through a gate to the lower surface of the body, flows back to the upper surface through-holes, and creates the pads on the upper surface.

In another method according to the invention, a body of the tile is molded from a first polymer compound, and to include a plurality of support member cores that downwardly depend from a general lower surface of the body. A second polymer compound, which when solidified is softer than the solidified first polymer compound, is used to overmold a skin onto the cores, such that the cores and the skin comprise preferably complete support members. Runners can be formed to connect each of the composite support members to a common fill point. The body can further include a plurality of through-holes in communication with such runners, such that the second polymer compound can be used to create a plurality of pads on the upper surface of the body at the same time that support member skins are being overmolded on the support member cores. To prevent flashing, the pads on the upper surface and the support members on the lower surface are preferably provided with laterally surrounding crush rings or pads. In one embodiment, the runners communicate to a common fill point, disposed adjacent the lower surface of the tile body, for each group of pads and cores. In another embodiment, a gate is formed to extend from the upper surface of the body to the lower surface thereof, and the second polymer compound is introduced at a point adjacent the upper surface. In this embodiment the second polymer compound will flow through the gate to the lower surface of the body, will thence flow through the runners, will form the support member skins on the lower surface, will flow further through the pad through-holes, and will form the raised pads on the upper surface of the tile body.

The present invention provides a first technical advantage in that a plastic tile can be created out of two polymer compounds of different strengths, durometer measurements and/or contrasting colors. As preferably fabricated in a two-shot injection molding process, flashing from the second polymer compound is avoided, permitting sharply defined features made of the second polymer compound on the tile's upper surface, which then will be aesthetically pleasing and commercially acceptable. If the first and second polymer compounds are selected for good adherence to each other, the tile may further have weight-supporting members on its lower surface that can support loads of the sort which can be imposed by motor vehicles, but yet provide nonslip characteristics. The nonslip pads on the upper surface and the nonslip members on the lower surface can be conveniently, rapidly and relatively inexpensively created in the second shot of the injection molding process. The latches and loops of the invention provide a further technical advantage in their ability to tightly hold together joined adjacent tiles under a lateral biasing force.

BRIEF DESCRIPTION OF THE DRAWINGS

These and further aspects of the invention and their advantages can be discerned in the following detailed description, in which like characters denote like parts and in which.

DETAILED DESCRIPTION

Figure 1:
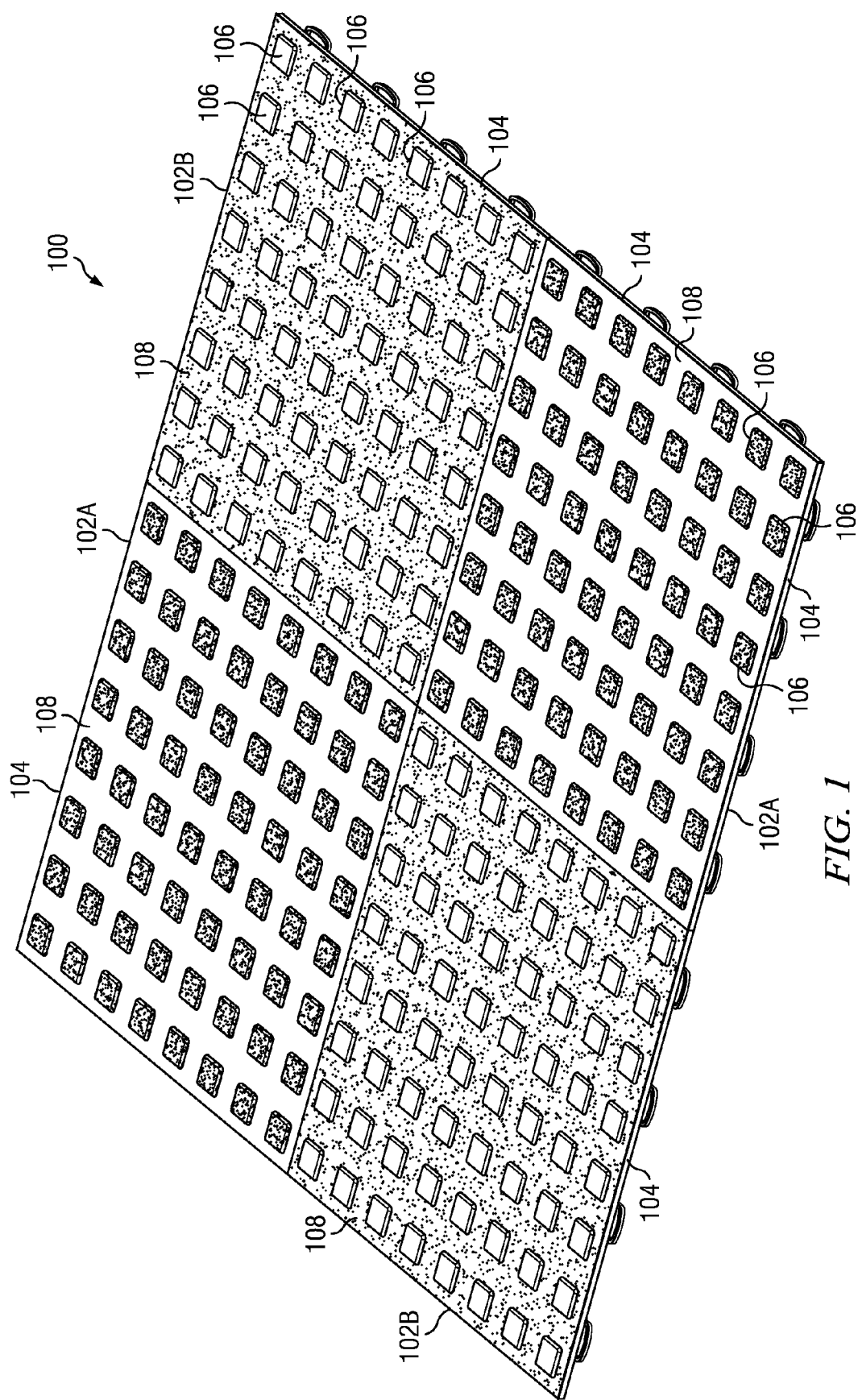
FIG. 1 is an isometric view of four modular floor tiles according to the invention, as assembled into a portion of a flooring surface.

Modular floor tiles according to the invention can be used to form a flooring surface, a representative portion 100 of which is shown in FIG. 1. In this illustrated embodiment, the flooring surface 100 is made up of tiles 102, including first floor tiles 102A and second floor tiles 102B, which are identical except as to color. The floor tiles 102A each have a body 104 injection-molded from a first polymer compound, preferably comprising a polymer which is relatively rigid when solidified and which can be selected from the group consisting of polyolefins including polypropylene and high molecular weight polyethylene, rigid thermoplastic polyurethane (TPU), acrylonitrile butadiene styrene (ABS) and rigid polyvinyl chloride (PVC). The first polymer compound may further include a filler such as talc to aid in achieving surface flatness, and a pigment. Floor tiles 102B have bodies 104 which preferably are made of a polymer compound identical to that forming bodies 104 of tiles 102A, except possibly for the choice of pigment or colorant. Each floor tile 102 preferably has an array of raised pads 106 on its upper surface 108. The pads 106, which preferably are spaced apart on the upper surface 108, are overmolded onto the upper surface 108 using a second polymer compound which has different characteristics from the first.

The differences between the first and second polymer compounds can include color and/or hardness. In one embodiment the second polymer compound, once solidified, is softer or less rigid than the first (once solidified), and has a higher coefficient of friction with respect to most objects than does the first. In another embodiment the hardness once solidified of the first and second compounds is about the same, but the colors are distinctly different. In a third embodiment, the hardness (once solidified) of the second compound is greater than that of the first. In a preferred embodiment, the second polymer compound can be selected from the group consisting of styrene ethylene butylene styrene based thermoplastic elastomer (SEBS TPE), other TPEs, soft TPU, or soft PVC. Polypropylene as the principal polymer in the first compound, and SEBS TPE as the principal polymer in the second polymer, are particularly preferred and have demonstrated good adherence to each other.

One aesthetic advantage of the invention is that the first and second polymers can be provided in contrasting colors, and that because of the molding techniques used in the invention, pads 106 can be colored differently than upper surface 108 yet present a sharp, commercially acceptable appearance.

Figure 2:
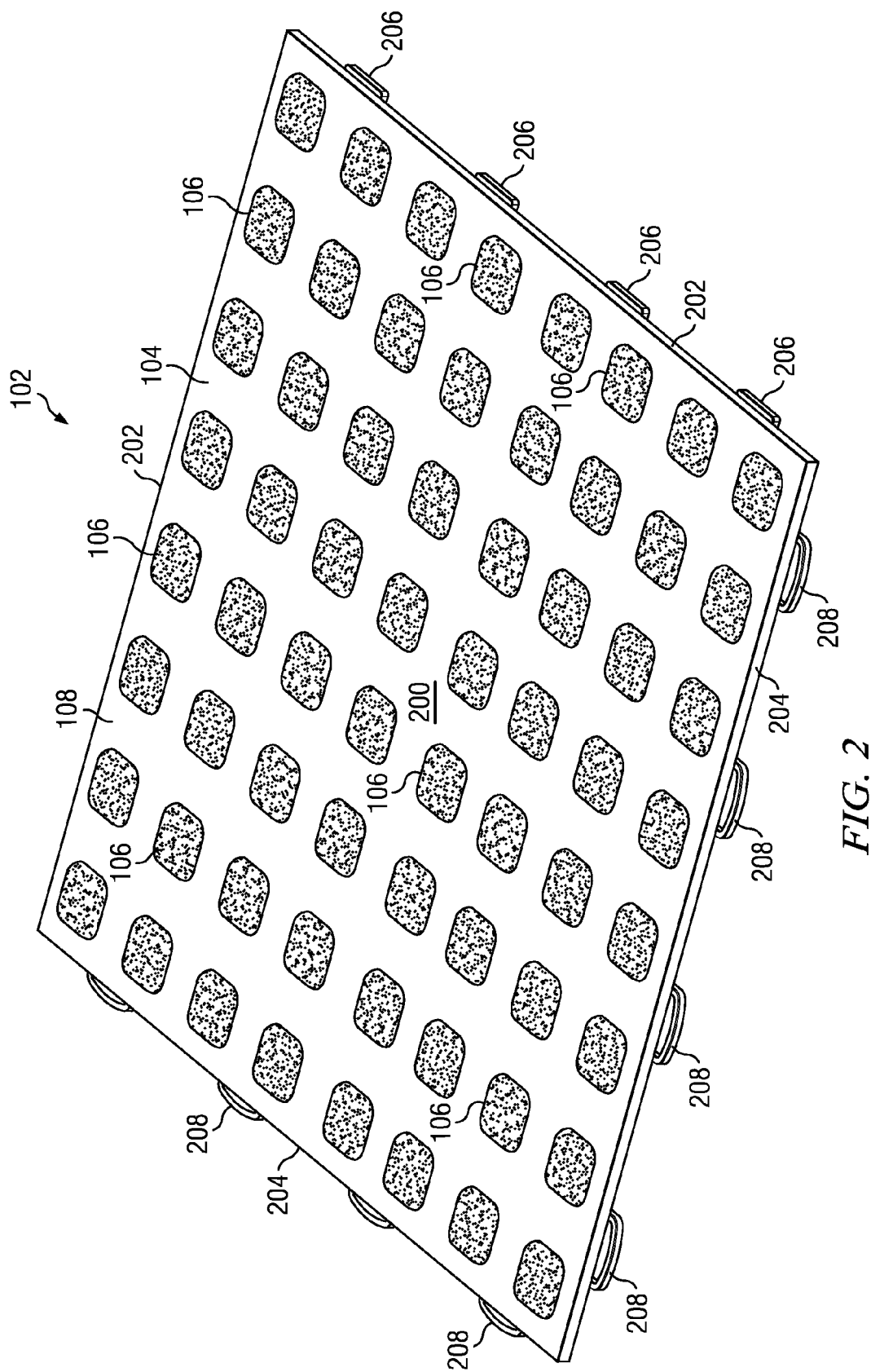
FIG. 2 is a front isometric view of one of the modular floor tiles shown in FIG. 1.

A top isometric view of one tile 102 is shown in FIG. 2. The body 104 of tile 102 is in main part a substantially horizontal and planar web 200 that has a plurality of lateral edges 202, 204. Each of the web edges 202, 204 downwardly depends from the upper surface 108 to a lower surface (not shown in FIG. 2). In the embodiment illustrated in FIG. 2, edges 202, 204 are orthogonal to surface 108, are planar and are at right angles to each other. But the tile 102, and the edges 202, 204 of it, can take other shapes. For example, the tile 102 can be hexagonal or triangular, and the edges 202, 204 could be wavy or curved instead of straight. Instead of edges 202, 204 being planar, as shown, they could be stepped or have tongues and corresponding grooves (see FIGS. 15-16 for an embodiment in which the lateral edges are stepped). It is preferred, however, that the shape and profile of each web edge 202 be complementary to the shape and profile of each web edge 204, such that when adjacent tiles are joined together, edges 202 and 204 will fit together closely.

The illustrated embodiment has a two-dimensional array of sixty-four raised pads 106 as located on a square surface of about twelve inches in length and width. Alternatively there could be as few as one pad 106, which preferably would be larger and possibly elongated and branched and/or sinuous. It is preferred to have a regular pattern of the pads 106 so that sub-units of the tile 102 can be trimmed off of it, in a manner to be explained below, and so that as trimmed the tile 102 will retain an aesthetically pleasing appearance. The illustrated pads 106 are rounded squares but could take other shapes such as circles, ovals, hexagons, triangles, distinctive logos or other shapes.

The first edges 202 each are equipped with at least one, and preferably several, latches 206. The second edges 204 each have at least one, and preferably several, loops 208. It is preferred that the number of latches 206, distributed in spaced relation along first edge 202, equal the number and position of loops 208, which are distributed in like spaced relation along each second edge 204. In the illustrated embodiment the latches 206 are pressed downward and snapped into loops 208, in a manner which will be described in further detail below.

Figure 3:
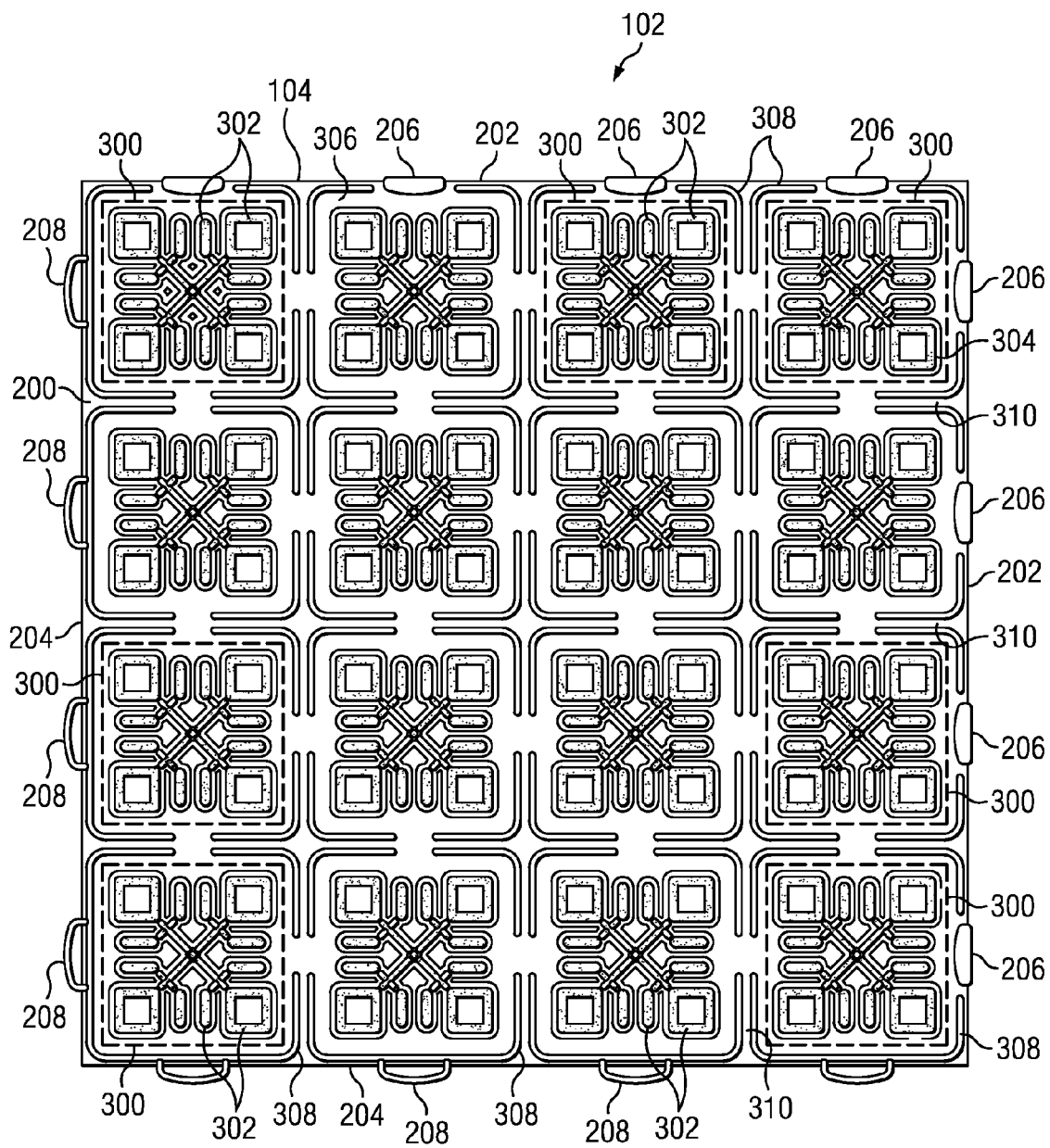
FIG. 3 is a back view of the modular floor tile shown in FIG. 2.

In the bottom view of tile 102 shown in FIG. 3, there can be seen sixteen groups 300 of support members 302. According to one aspect of the invention each support member 302 is formed in part by a skin 304 of a relatively soft polymer compound such as once comprising TPE, and has a core that is molded as part of the body 104 from a polypropylene-based compound or other relatively rigid polymer composition. Some of the support members 302 are annular and take the shape of squares with empty centers. Other support members 302 in each group 300 are short linear segments. The support members will be discussed in further detail below. Preferably the general lower surface 306 also has, depending downwardly from it, a plurality of elongate rigid support ribs 308 that have no TPE or other soft polymer skin. The support ribs are integrally molded with the web 200 of body 104.

In the illustrated embodiment, the rigid support ribs 308 form partial outlines of rounded squares, each one of which contains one of the groups 300 of the support members 302. The rigid support ribs 308 are so positioned that one or more of them are not very far away from any group 300 of support members 302. This permits the rigid support ribs 308 to accept most of the load of heavy objects (such as vehicles) imposed on the upper surface 108 of tile 102.

The elongate ribs 308 also define and delimit linear channels 310, one set of which are aligned along a length of the tile 102, and another set of which are at right angles to these and are aligned along a width of the tile 102. The channels 310 are disposed between rather than through the support member groups 300 and (on the upper surface) the pads 106. This provides the consumer a trim guide for cutting apart tile 102 in a lengthwise or widthwise direction, or both, in predetermined increments such as three inches or twenty-five percent of tile 102's length or width. As projected onto the single horizontal plane occupied by web 200, the center line of each channel 310 will substantially exactly bisect the distance between the centers of adjacent pads 106 on either side of the center line. The distance from the center line of the channel 310 to a center of a pad 106 is one-half of the distance from one center of a pad 106 to a next adjacent pad 106. Since pads 106, support member groups 300, latches 206 and loops 208 repeat in a regular pattern, such as on three-inch centers, and since the pads 106 are exactly twice as far apart from each other as the closest of them are to the edge 202 and/or 204 (see FIG. 2) or a channel 310, the consumer may use trimmed tiles on the periphery of the flooring surface to extend the flooring surface by another three, six or nine inches, or alternatively 25%, 50%, or 75% of the length or width of tile 102. The regular pattern and spacing of raised pads 106 will continue over from untrimmed tiles onto such trimmed peripheral tiles without visually noticeable interruption and therefore the result will be aesthetically pleasing.

Figure 4:
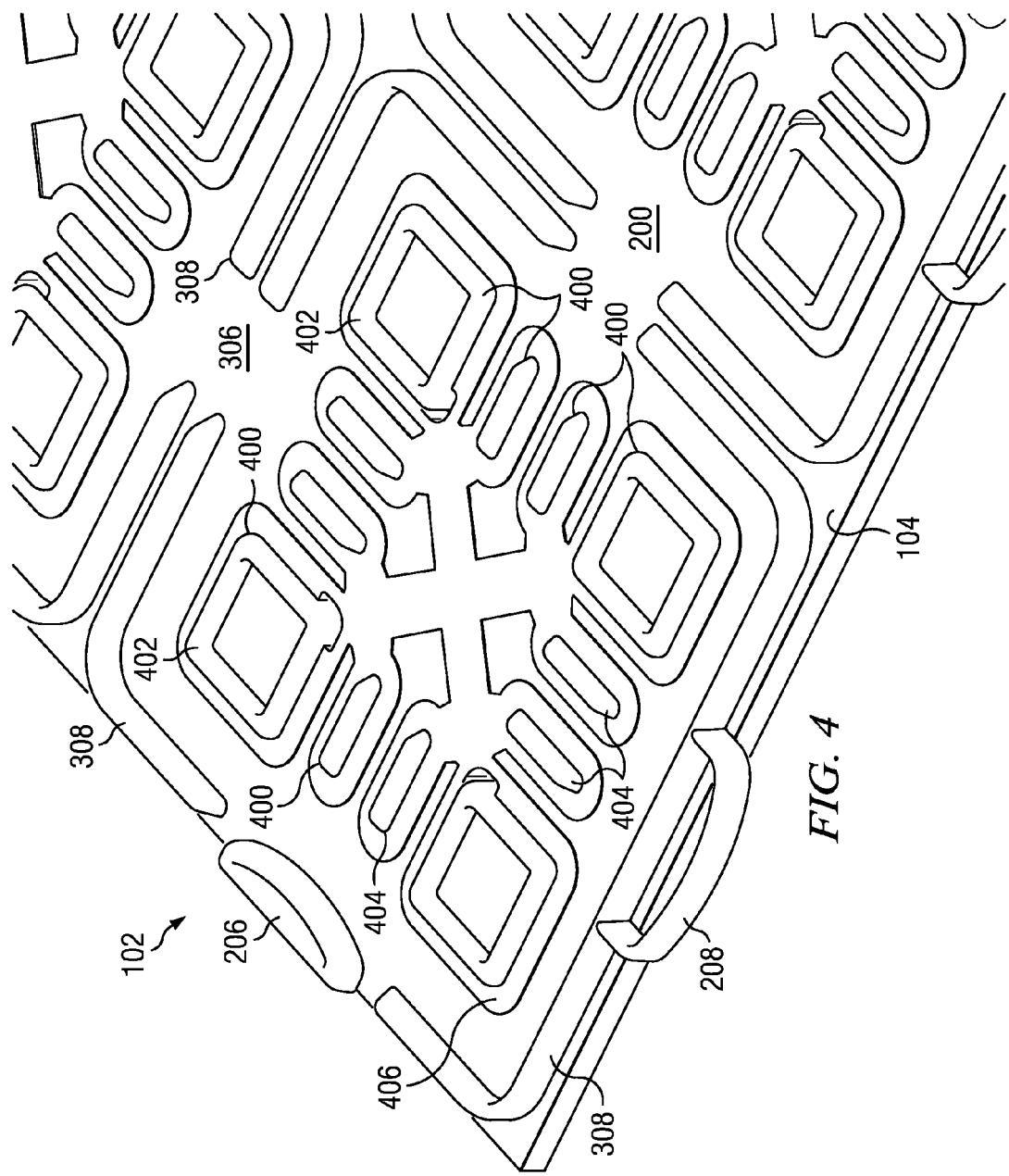
FIG. 4 is an isometric detail of the back of the floor tile shown in FIG. 3, illustrating a tile body prior to overmolding with a second polymer compound.
Figure 5:
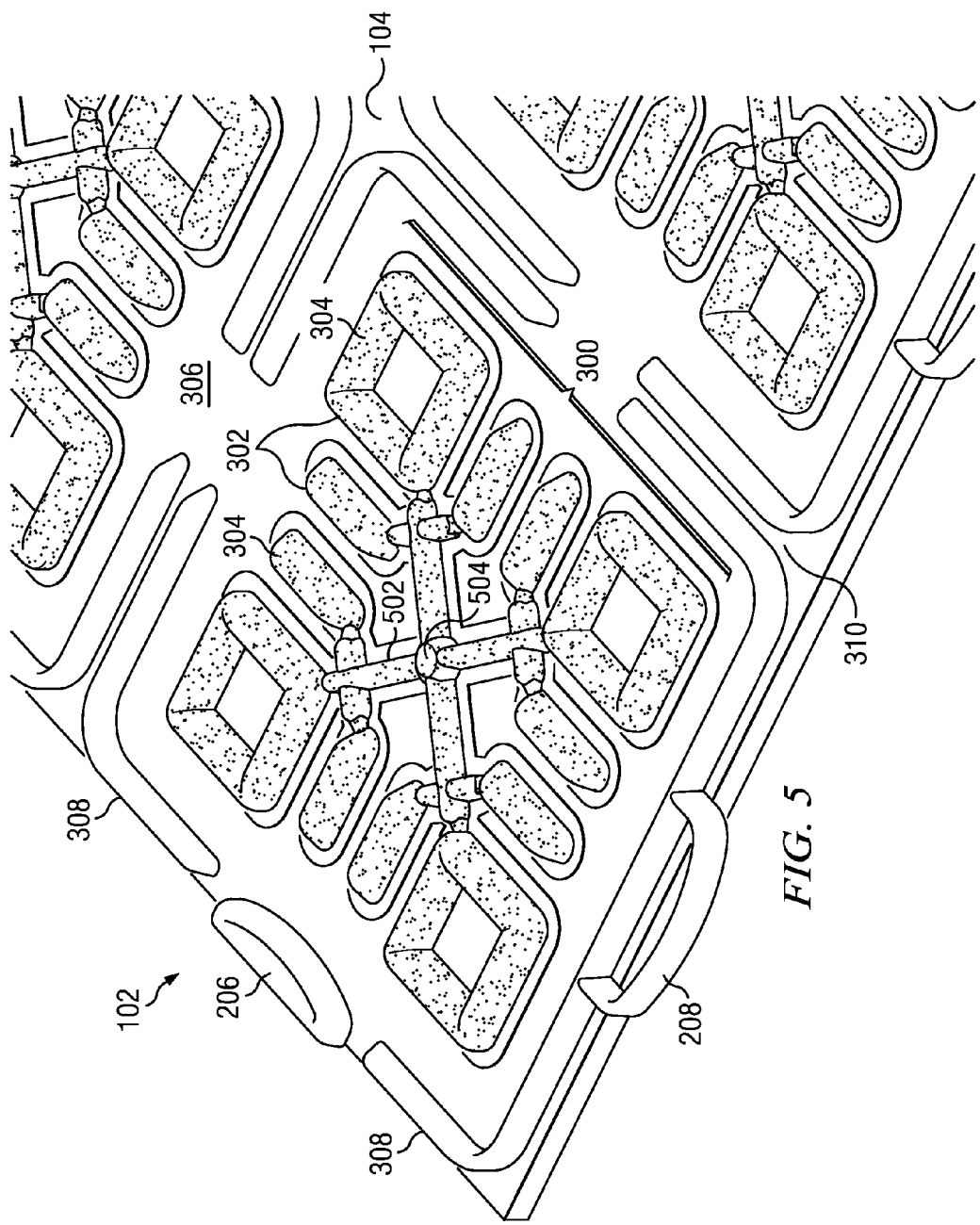
FIG. 5 is an isometric detail of the same tile region shown in FIG. 4, shown after overmolding has been completed.

FIGS. 4 and 5 are details of the tile lower surface, showing a single group 300 of support members 302 before and after a second polymer compound is overmolded onto the body 104 of the tile 102. In FIG. 4 there can be seen a plurality of support member cores 400 which depend downwardly (in this view, extending toward the top of the paper) from a general lower surface 306 of the substantially horizontal web 200 that makes up most of the tile body 104. The cores 400 do not downwardly depend as far as the support ribs 308. Ribs 308 are not overmolded. In the illustrated embodiment there are provided, in each group 300 of support members 302, four annular cores 402 and eight cores 404 formed as short linear segments and in parallel pairs nearby the annular cores 402. Also seen here is, for this group 300, a crush pad 406 which in use is slightly lower than the general surface 306 (in this bottom view, pad 406 is slightly raised relative to general surface 306). The crush pad 406 is formed to be closely adjacent all of the support member cores 400 and laterally surrounds all of the cores 400 and the runners 502 connecting the support members. The crush pad 406 is finished to have a smooth surface (general lower surface 306 can instead be textured) and is used as a shutoff surface to prevent the flashing of the second polymer compound during a "second shot" or overmolding step of fabrication.

FIG. 5 shows the same area after overmolding. A skin 304 of the second polymer now appears on the bottom surfaces and sides of each of the cores 400, and in this embodiment completes the support members 302. While in one embodiment the skins 304 could be overmolded separately on each core 400, in the illustrated embodiment the skins 304 within the support member group 300 are part of a continuous phase. To save cost, the area covered by skins 304 is limited and, as seen in FIGS. 3 and 5, does not include a majority of the tile body lower surface 306. The skins 304 preferably do not extend to cover the centers of the annular cores 402 or other regions outside of crush pads 406. Lateral runners 502 connect a common fill point 504 to each of the skins 304. It has been found that as the second of a double-shot injection, skins 304 molded of a SEBS TPE compound have excellent adherence to the preferably polypropylene compound cores 400 (FIG. 4). As completed, the composite support members 302 are of approximately the same depth (in a direction orthogonal to the web 200) as the support ribs 308. The support members 302 provide further structural support to the web 200 but at the same time act as a friction surface to grip the surface upon which the tiles are laid.

Figure 6:
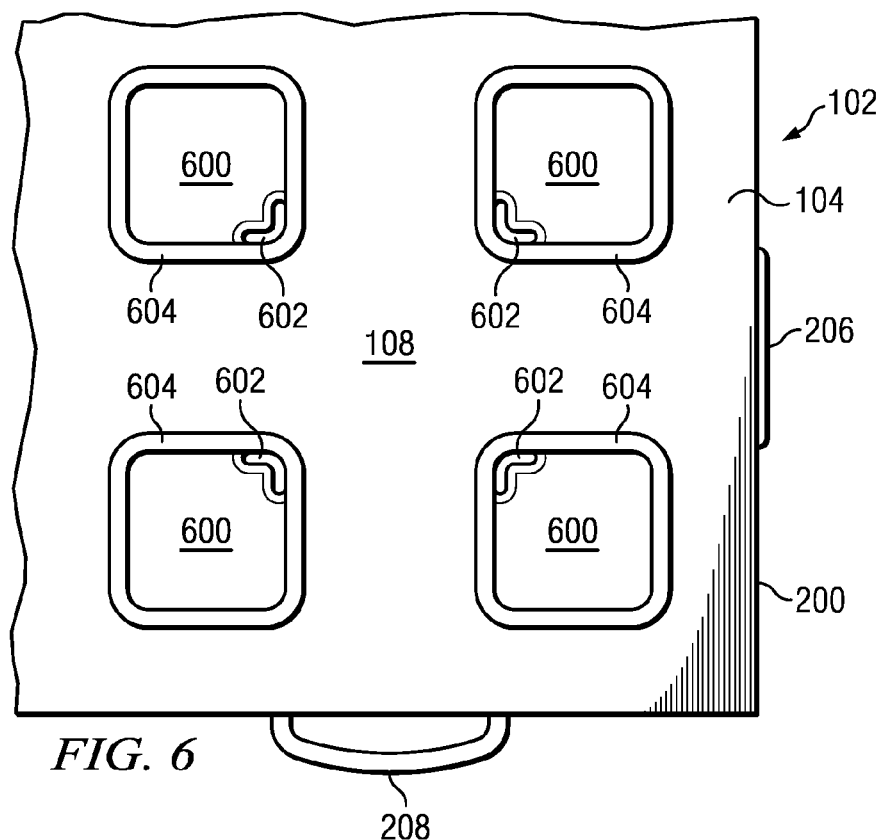
FIG. 6 is a detail of the upper surface of a tile according to the invention prior to overmolding, showing flow-through points and crush rings.
Figure 7:
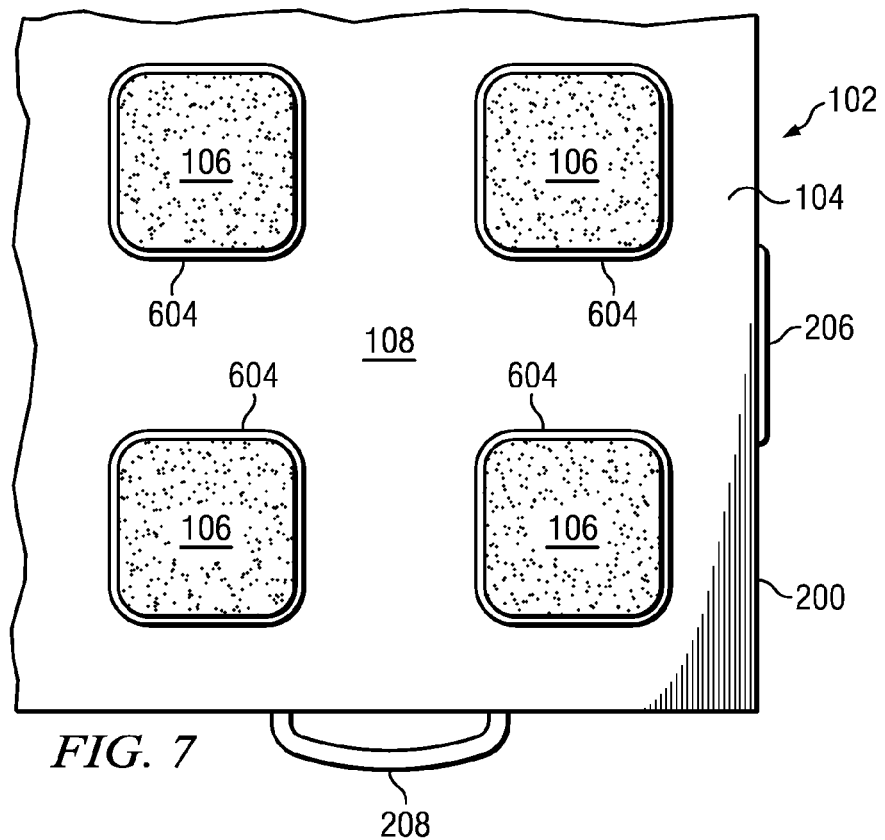
FIG. 7 is a detail of the same region illustrated in FIG. 6, shown after top surface pads have been overmolded.

FIGS. 6 and 7 are details of a similarly sized area on the top of tile 102, before and after overmolding, illustrating one group of pads 106, which are interconnected in a continuous phase of solidified second polymer compound. In the illustrated embodiment, each of the overmolded pads 106 resides in a shallow recess or receptacle 600 whose surface is lower than that of the general upper surface 108. For each recess 600 there is provided at least one through-hole 602 which communicates the top surface of the tile web 200 to a lower surface thereof. In the illustrated embodiment the through-holes are a small fraction (about 5%) of the bottom of the recesses 600, as the viscosity (at molding temperature) of the preferred second polymer compound is low enough, and the second-shot temperature and injection pressure are high enough, that no larger through-holes are necessary to flow molten polymer from the lower side of the tile body 104 to the upper side thereof, nor is more than one through-hole per recess 600 necessary in the preferred embodiment. Limiting the size of through-holes 602 enhances the structural integrity of the tile 102. However, in alternative embodiments, the size and/or number of the through-holes 602 may be increased to accommodate more highly viscous second-shot polymer compounds.

The recesses 600 are each laterally surrounded by a crush ring 604. Each crush ring 604 is finished to be smooth (in contrast, the general upper surface 108 of the body 104 is preferred to be textured) and is slightly raised relative to the general upper surface 108. The crush rings 604 provide a tight overmold shutoff that prevents the flashing of the second polymer compound outside the confines of the crush rings 604.

FIG. 7 is a detail of the tile upper surface after the overmolding step. The second polymer compound is injected into the mold at one or more points adjacent the lower surface of body 104, flows through each of the through-holes 602, and occupies cavities in the second-shot mold to create the raised pads 106. A top surface of the pads 106 is raised above that of general surface 108, creating a nonslip surface characteristic. Through this methodology overmolding artifacts on the upper surface of the tile 102 are avoided, producing a more pleasing appearance.

Figure 8:
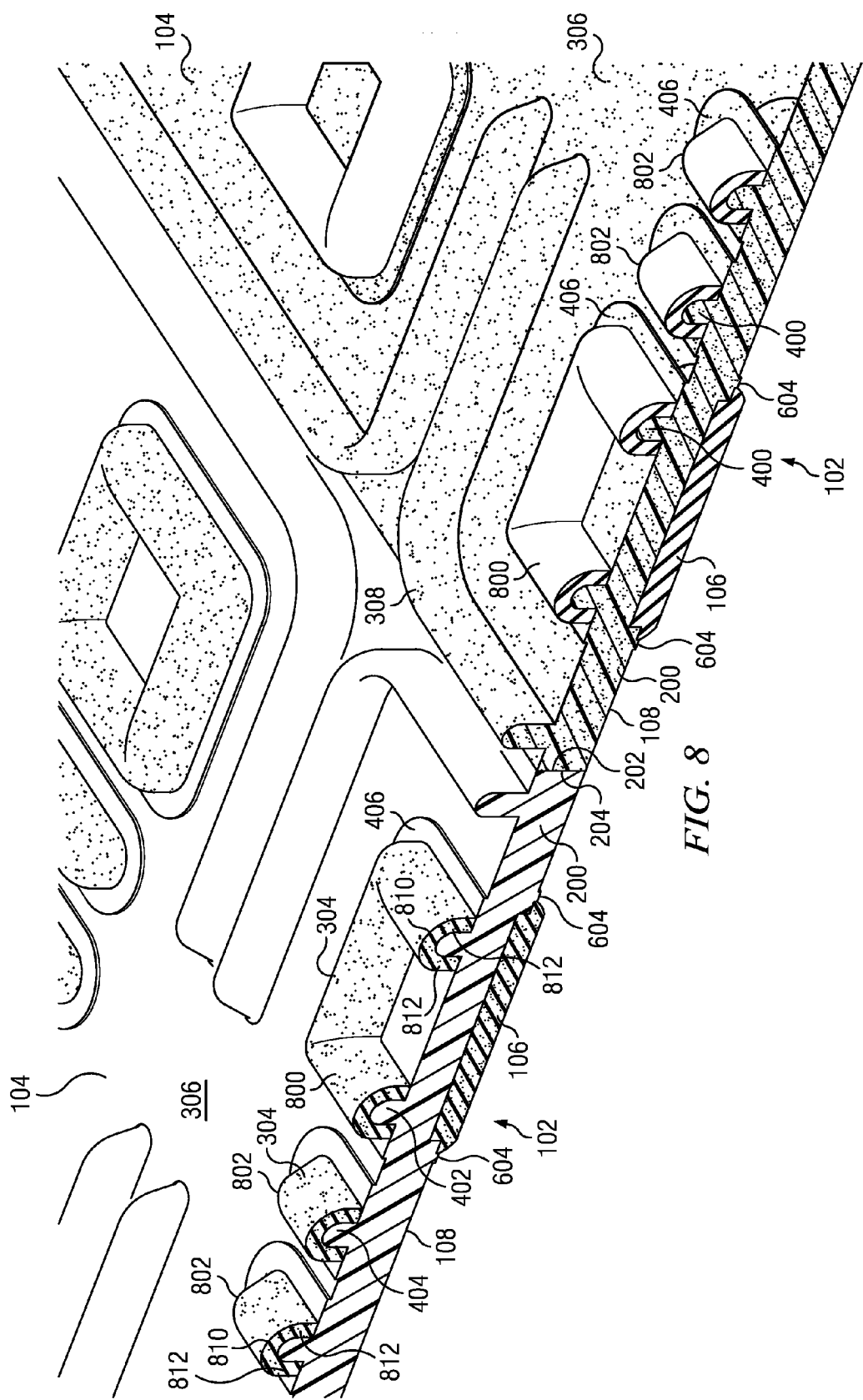
FIG. 8 is a magnified sectional detail of two adjoining tiles showing internal structure of the support members.

FIG. 8 is a sectional view of two tiles 102 joined together, taken through annular support members 800, linear support members 802 and rigid ribs 308. Each skin 304 completing a support member 800, 802 has a portion 810 which is formed on the lower end or bottom surface of each core 400, 402. Preferably, each skin 304 also includes portions 812 which cover all or portions of adjoining side walls of the cores 400, 402.

The rounded square or annular support members 800 are each in approximate registration or alignment with the edges or lateral periphery of a respective raised pad 106 on the upper surface 108 of the tile 102. The support members 800 will receive any weight placed particularly on the raised pads 106 and will prevent any shear stress from developing in nearby regions of the horizontal web 200. The support members 800 and 802 each help support weight placed on the upper surface 108 of tile 102, while at the same time providing a friction or nonslip surface that will engage the substrate on which the tile is placed. The rigid members 308 provide rigid support of the entire tile 102 and delimit any compression of the TPE skin 500, the lower surface of which is preferably in the same plane as the lowest portion of ribs 308. FIG. 8 also shows the preferred profile of lateral edges 202, 204, which is planar and orthogonal to the plane of web 200.

Figure 9:
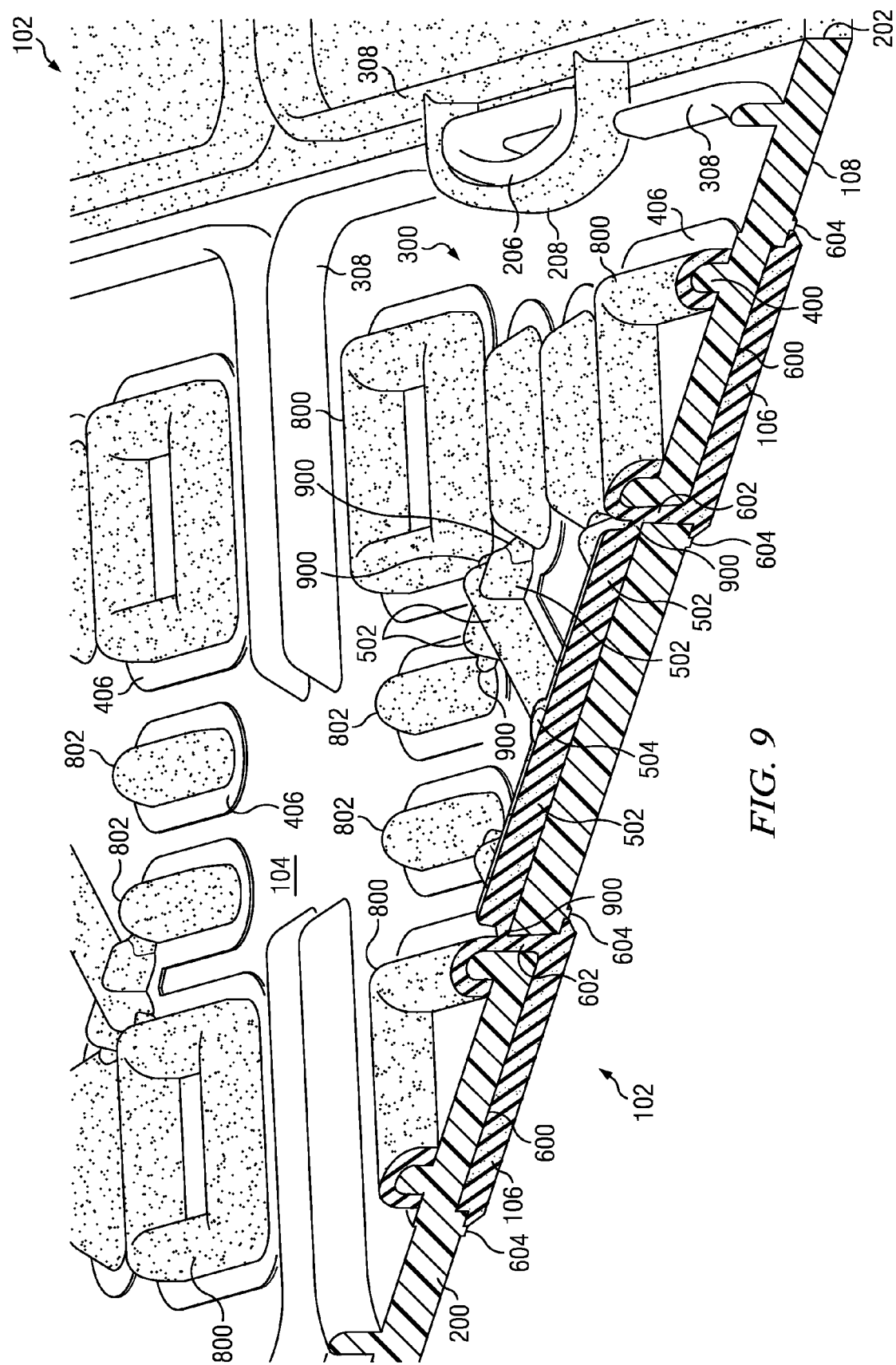
FIG. 9 is a magnified sectional detail of a tile showing the relationship of the overmolded features on the tile's lower and upper surfaces.

FIG. 9 is a magnified diagonal cross section (lower side up) of part of a tile 102, taken through two raised pads 106, support members 800 underneath and in approximate registry with respective ones of the raised pads 106, a central fill point 504 and two runners 502. In this illustrated embodiment, one central second-shot polymer compound fill point 504 is provided for the skins of an entire group 300 of twelve support members 800, 802, and four associated raised pads 106 on the upper surface 108 of the tile 102. This illustrated embodiment has sixteen fill points 504 on tile 102, one for each interconnected group 300 of support members 302 and associated pads 106. In an alternative embodiment the polymer compounds used for different ones of the fill points could be in different colors, producing groups of pads 106 on the upper surface 108 which are colored differently than other groups of pads 106.

Figure 10:
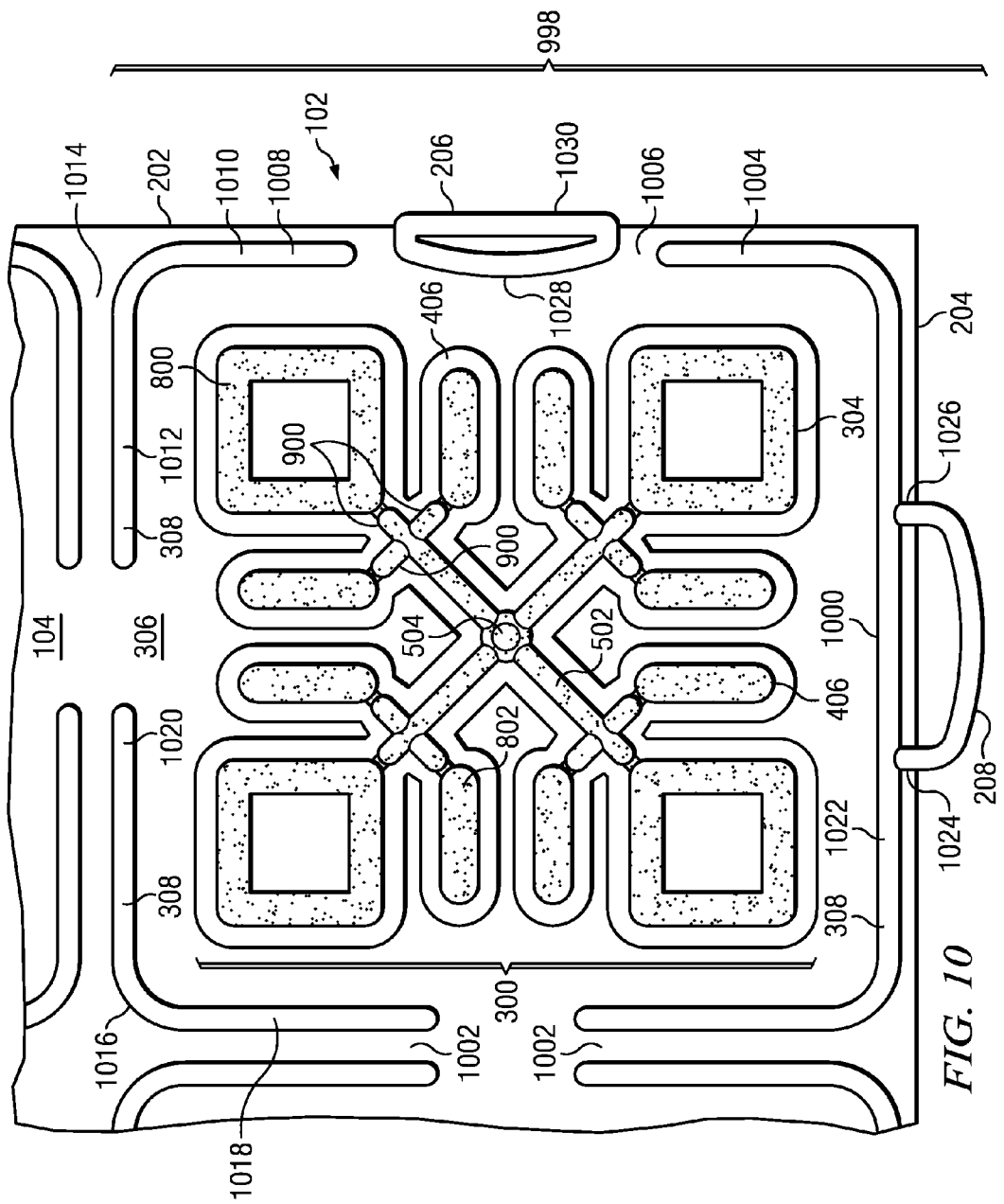
FIG. 10 is magnified bottom view detail of a tile according to the invention.

The central fill point 504 is connected by a set of runners 502 which extend laterally from the fill point 504, and on the lower surface of the web 200, to each of the support members 800, 802 in the group 300 where the fill point 504 is located. In the illustrated embodiment, there are four main runners 502 that are separated by ninety degrees from each other. At its end remote from the fill point 504, each runner 502 branches into three branches 900 that respectively connect to an annular support member 800 and two flanking linear support members 802. As can be seen in the sectioned runners 502, one of the branches 900 of each runner 502 is continuous with a through-hole 602, providing a conduit for the second polymer compound to the upper side 108 of the tile 102. Accordingly the fill point 504 is laterally displaced from the through-holes 602, while the through-holes 602 are spaced apart from each other in at least two directions. As seen in FIGS. 9 and 10, the common fill point 502 is in the geometric center of the though-holes 602. Likewise the pad 106 formed on the top of tile 102, is laterally displaced from the fill point 504.

FIG. 9 also shows a latch 206 which has been inserted into a respective loop 208. The loop 208 is preferably molded as an extension of a rigid rib 308 in an adjacent tile 102. The latch 206 is integrally formed with web 200 and is formed in a gap between two ribs 308 that are adjacent an edge 202. The gap forming the discontinuity in linearly aligned rib segments 308 is large enough to have the latch 206 and the loop 208 disposed therebetween.

FIG. 10 is a bottom plan view of a one-sixteenth portion 998 of a tile 102, the illustrated portion 998 occupying an outer corner of tile 102. This corner 998 has three ribs 308 that surround the group 300 of support members 302. A rib segment 1000 is aligned with and positioned slightly laterally inwardly from an edge 204 of the tile 102. Rib segment 1000 continuously curves on its left side (as seen in this FIGURE) to form a boundary for a channel 1002. Rib segment 1000 has a section 1004 which continuously curves from the right side of rib section 1022 to become parallel and laterally inwardly offset from lateral edge 202, terminating at a gap 1006. A rib segment 1008 defines an upper right hand boundary of the portion or cell 998 and includes a portion 1010 that is in parallel with the lateral edge 202, a portion 1012 which helps define a boundary for a trim channel 1014, and a curved portion in between these. A third rib segment 1016, defining an interior corner of the cell 998, includes a portion 1018 that helps define channel 1002, a portion 1020 that helps define channel 1014, and a curved transition between them.

A portion 1022 of the rib segment 1000 that is near and parallel to lateral edge 204 has a loop 208 integrally formed with it. The loop 208 is connected to the rest of tile 102 only by a pair of widely spaced-apart and limited connection points 1024 and 1026. A cross-section of loop 208 and its length between connection points 1024 and 1026 are so preselected that loop 208 will be relatively flexible in comparison to the latch 206. The latch 206 may be a solid plug (not shown) or, as appears in the illustrated embodiment, may include a downwardly depending inwardly facing, convex wall 1028, connected at both of its ends to a downwardly depending, laterally outwardly facing wall 1030. The entire wall 1028, and a substantial portion of the wall 1030, are attached to the general lower surface 306 of the tile 102. Neither arcuate wall 1028 nor wall 1030 is as long as loop 208. These differences in size and degree of attachment to the rest of the tile 102 make the latch 206 substantially rigid relative to loop 208. In any interference between them, therefore, the loop 208 will flex or expand and the latch 206 will not substantially deform.

Figure 11:
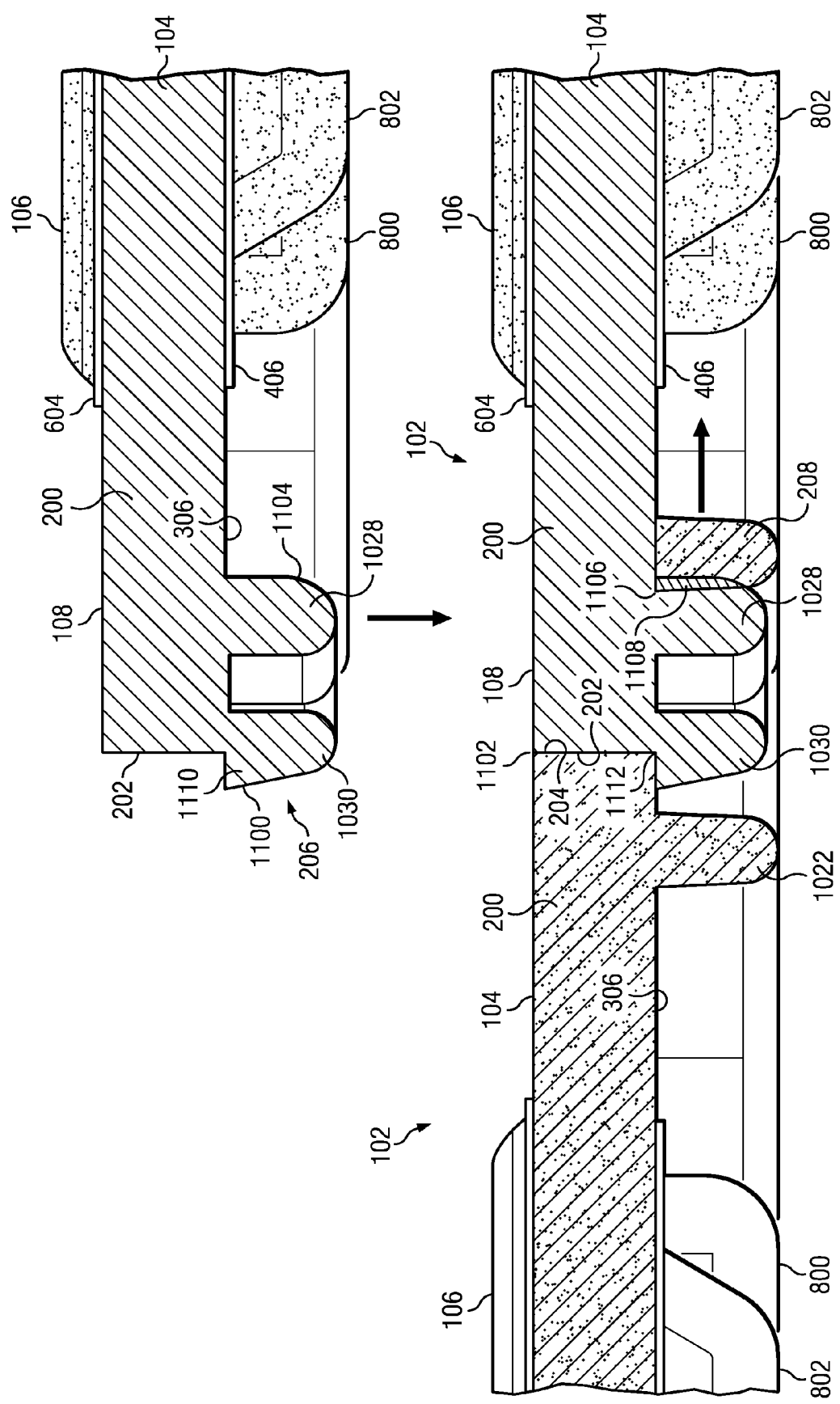
FIG. 11 is a magnified sectional view of two tiles being assembled together.
Figure 12:
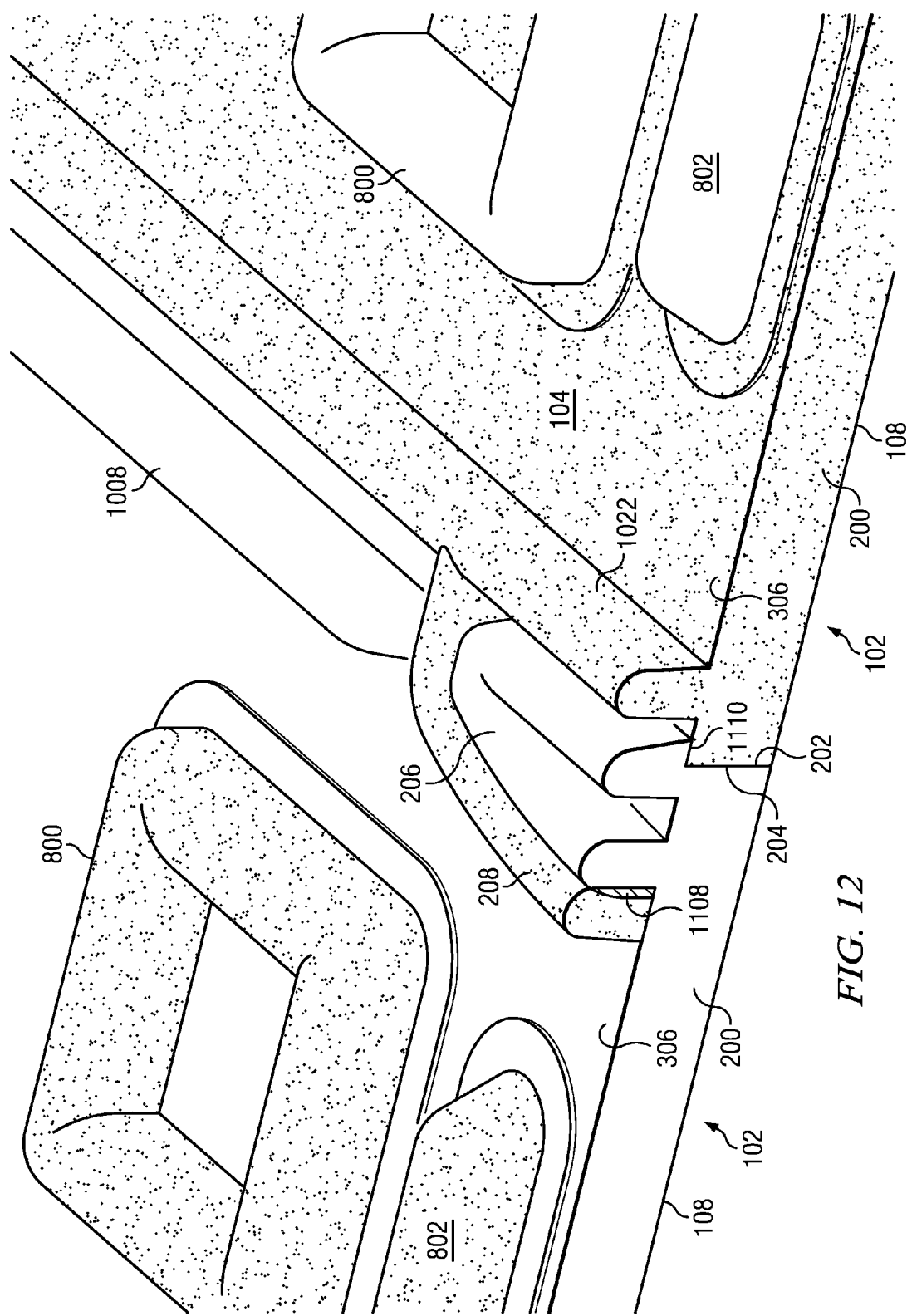
FIG. 12 is a magnified sectional view of two joined tiles taken through cooperating loop and latch structure.

FIG. 11 is a highly magnified sectional view showing how a male latch 206 is snapped into a receiving female loop 208 of an adjacent tile 102. The outer wall 1030 of the latch 206 has a surface 1100 which is beveled or sloped so that it will cam against an upper corner 1102 of the lateral edge 204. The inner wall 1028 of the latch 206 has a sloped or beveled surface 1104 which will cam against an upper interior corner or ridge 1106 of the loop 208. As the latch 206 is pressed downward into the loop 208, an interference will develop between the inner facing wall 1028 of the latch 206 and the loop 208, as shown by the hatched region 1108. Since wall 1028 of latch 206 is substantially more rigid than loop 208, the loop 208 will elastically expand along its length and will flex laterally outwardly from the tile 102 to which it is attached (in FIG. 11, rightward). Once the latch 206 is driven down far enough, a horizontal ledge 1110 of the outer latch wall 1030 will snap past a lower corner 1112 of the lateral edge 204 and will slide to the left along the general lower surface 306 of the adjacent tile 102. Even after this happens the loop 208 will remain under tension. This biases lateral edge 204 against mating lateral edge 202, producing a tight fit of these two surfaces and the tiles of which they are a part. As shown, the depth (in a direction orthogonal to the plane of web 200) of walls 1028, 1030 is slightly less than the depth of the walls of rib segment 1022 and loop 208, permitting a degree of overdrive when snapping the latch 206 into the loop 208. FIG. 12 is an isometric sectional view of two adjacent tiles taken through a loop 208 and an inserted latch 206, again illustrating the interference fit between the two.

Figure 13:
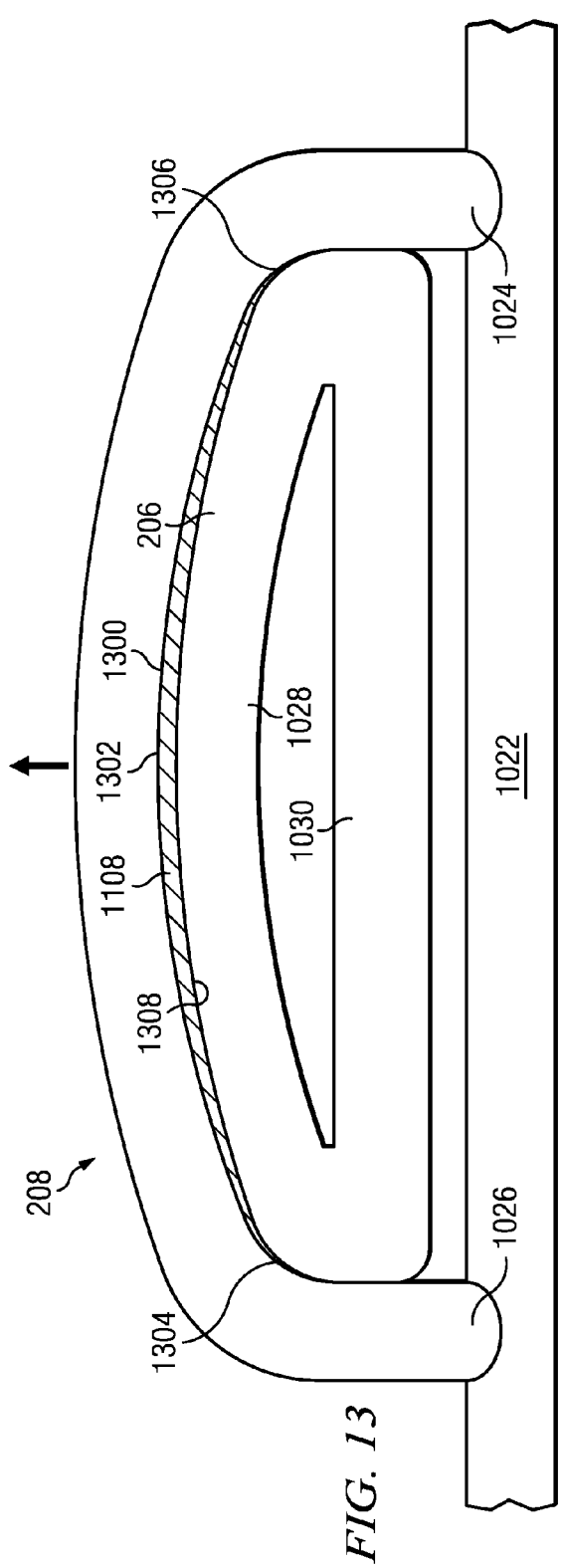
FIG. 13 is a diagram showing nonlinear interference between a latch and a loop according to the invention.

FIG. 13 is a schematic detail, from a bottom view, showing a latch 206 as it is received into a loop 208. The loop 208 is illustrated here in its unstretched and unflexed condition. As so superimposed a region 1108 of interference will exist between loop 208 and an inner wall 1028 of the latch 206, and this region 1108 will be of variable depth as measured in a lateral inward/outward direction. The inner wall 1028 has an inwardly-facing surface 1300 which has on it a point 1302 which is innermost and is farthest away from the lateral edge 202 of body 104 (see FIGS. 11 and 12) with which it is most closely associated. Preferably the inwardly-facing surface 1300 is arcuate and convexly so relative to the center of the tile 102. Surface 1300 can be more sharply curved than is shown. As one travels away from the innermost point 1302 along the surface 1300 (to the left or right in this FIGURE), the depth of interference region 1108 decreases, until the interference region 1108 vanishes altogether as one approaches either end 1304, 1306 of the surface 1300. Preferably the inner surface 1308 of the loop 208 is arcuately concave. More preferably the degree of concavity of the inner surface 1308 is less than the degree of convexity of the inward facing surface 1300 of the latch 206, that is, the surface 1308 is more gradually curved than surface 1300. In this way, the interference is minimized at the attachment points 1024, 1026, preventing the loop 208 from becoming over-stressed at its attachment points 1024, 1026 and reducing the likelihood of loop failure. It is relatively easy for loop 208 to stretch and flex at its middle, opposite innermost latch wall point 1302, as the length to either point 1026 or point 1024 is long. But the resistance to such stretching and flexing will increase as one approaches point 1024 or point 1026, as the points of attachment are closer. Varying the degree of interference in the manner shown therefore reduces the stress at the attachment points 1024, 1026.

Figure 14:
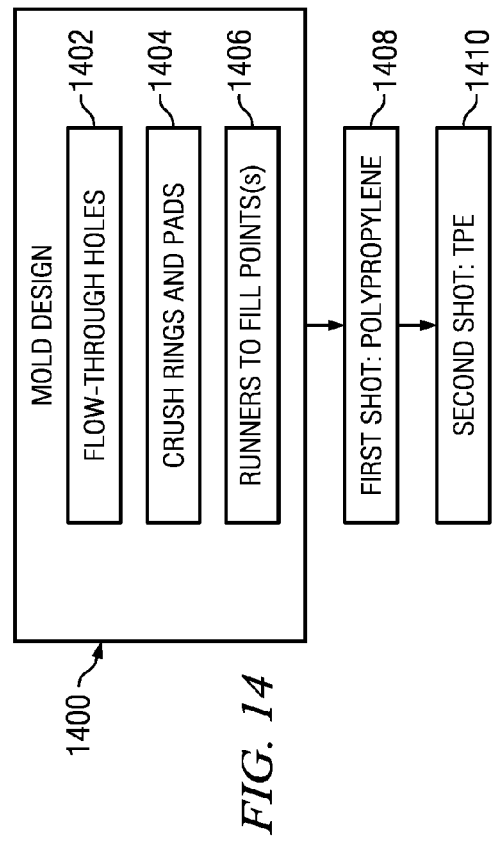
FIG. 14 is a schematic flow diagram illustrating steps in a manufacturing process according to the invention.

FIG. 14 is a schematic block diagram illustrating steps in a floor tile manufacturing process according to the invention. Step 1400 is a mold design step including many substeps, of which three are pertinent here. The mold (and the part produced thereby) should have certain characteristics, and these include the provision of flow-through holes at substep 1402. The flow-through holes are positioned to communicate the recesses 600 for the pads 106 (see FIG. 6), on the upper surface 108, to the central second polymer compound fill points 504 adjacent the lower surface 306. The second shot of polymer compound will use these flow-through holes (602 in FIG. 9) to access the cavities 600 in which the pads 106 are to be created. The size and number of through-holes 602 will be dictated in part by the viscosity of the second polymer compound at molding temperature, and the injection molding pressure to be used.

The designer also, at substep 1404, provides for crush rings 604 (FIG. 6) on the top surface 108 of the tile 102, and crush pads 406 (FIG. 8) on the bottom surface 306 of the tile 102. These surfaces preferably are flat, smooth, and slightly raised or outward in relation to the rest of the surfaces of which they are a part. The crush rings 604 and crush pads 406 closely laterally surround the regions into which the second polymer compound is to flow, creating a clean shutoff of the second polymer compound and preventing flashing. This is particularly important on the upper surface 108 as it will affect the aesthetic acceptability of the tile 102.

At substep 1406, the designer provides runners 502 (see FIG. 9) to communicate the central fill points 504 with the support members 800, 802 and the through-holes 602. The result of step 1400 will be tooling that can be used in a two-shot injection molding process according to the invention.

The mold is placed in an injection molding press and a first shot of polymer compound is injected into the mold at step 1408. As explained above, this first polymer compound is thermoplastic and preferably is relatively rigid, and can comprise polypropylene. Then, at step 1410, the mold is prepared for a second injection shot, in which further molding structure is used to define surfaces of pads 106, skins 304 and runners 502. A second shot of polymer compound is then injected into the mold, using a second polymer compound which has different characteristics than the first polymer compound, such as being harder or softer or being of a different color. Preferably the second polymer is elastomeric and for example can be constituted by SEBS TPE or another TPE. A preferred result of molding steps 1408 and 1410 is a composite floor tile which includes a body capable of withstanding a large amount of weight (such as might be imposed by a vehicle wheel) but still has nonslip characteristics on both its upper and lower surfaces.

Figure 15:
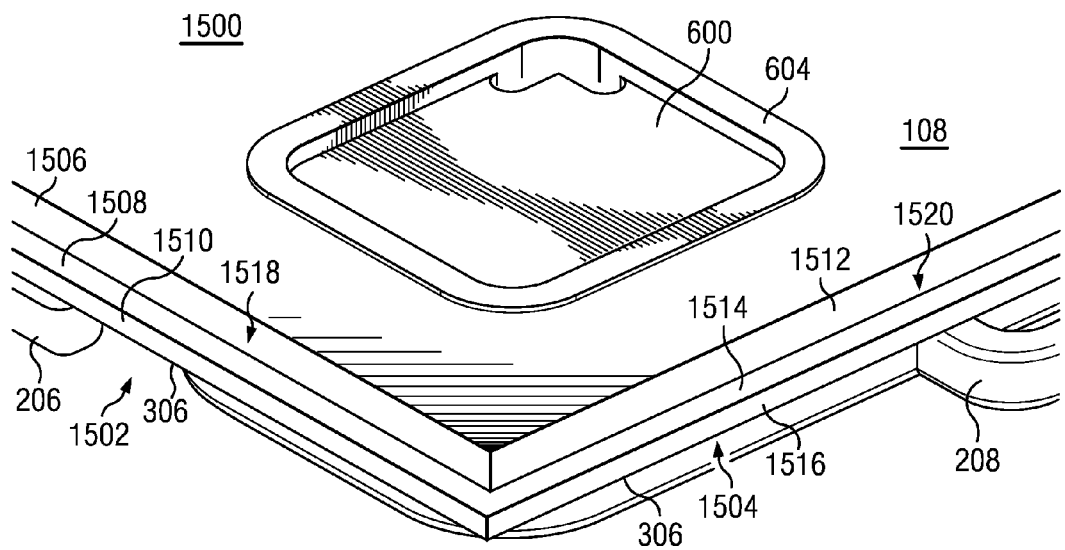
FIG. 15 is an isometric magnified detail view of a corner of a tile body according to a second embodiment of the invention, prior to overmolding a peripheral seal thereon.

FIGS. 15-18 illustrated an embodiment of the invention in which the overmolded structure includes a peripheral seal that is used to seal to adjoining tiles when a floor surface is assembled. FIG. 15 is an isometric view of a floor tile body 1500 that is similar to body 104 (FIG. 2) but with lateral edges 1502, 1504 that are stepped rather than orthogonal to the web 200 and planar. This view is taken after molding the first polymer compound but prior to overmolding. In this illustrated embodiment, stepped lateral edge 1502 has a laterally inwardly disposed vertical surface 1506 which extends downwardly from general upper surface 108 to a horizontal shelf 1508. The horizontal shelf extends laterally outwardly from vertical surface 1506 to a second, laterally outwardly disposed vertical surface 1510. Vertical surface 1510 extends from the shelf 1508 to the lower surface 306 of the tile body 1500.

In the illustrated embodiment a lateral edge 1504 is similar in form to lateral edge 1502. A first, laterally inwardly disposed vertical surface 1512 extends from general upper surface 108 of the tile body 1500 to a shelf 1514. The shelf 1514 extends laterally outwardly from the vertical surface 1512 to a second, laterally outwardly disposed vertical surface 1516. The vertical surface 1516 extends from the shelf 1514 to the general lower surface 306 of the tile body 1500. Surfaces 1506, 1508 and 1510 define a recess (more particularly, a step) 1518 which can be subsequently occupied by an overmolded peripheral seal. Similarly, surfaces 1512, 1514 and 1516 define a step 1520 which can be subsequently occupied by an overmolded peripheral seal, preferably continuous with the seal occupying step 1518. While this illustrated embodiment uses steps 1518, 1520 as locations which can be occupied by a peripheral seal, other profiles are possible, such as curved or keyed profiles and/or ones which include a physical interference to the delamination of the peripheral seal from the body 1500. As before, it is preferred to mold the body 1500 from a relatively strong and rigid polymer compound such as one comprising polypropylene.

Figure 16:
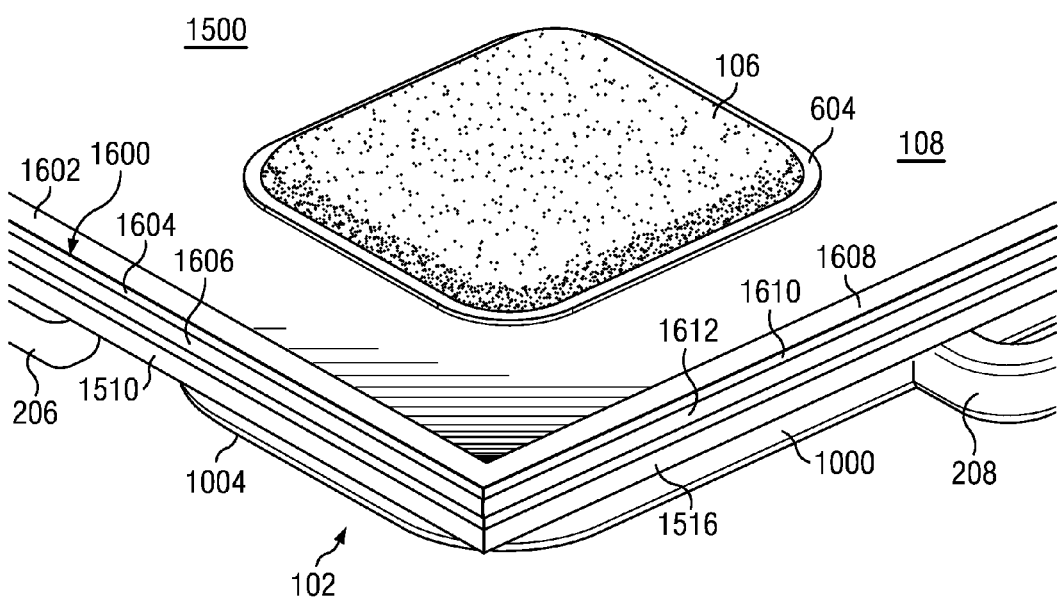
FIG. 16 is the tile body corner seen in FIG. 15, after overmolding.
Figure 17:
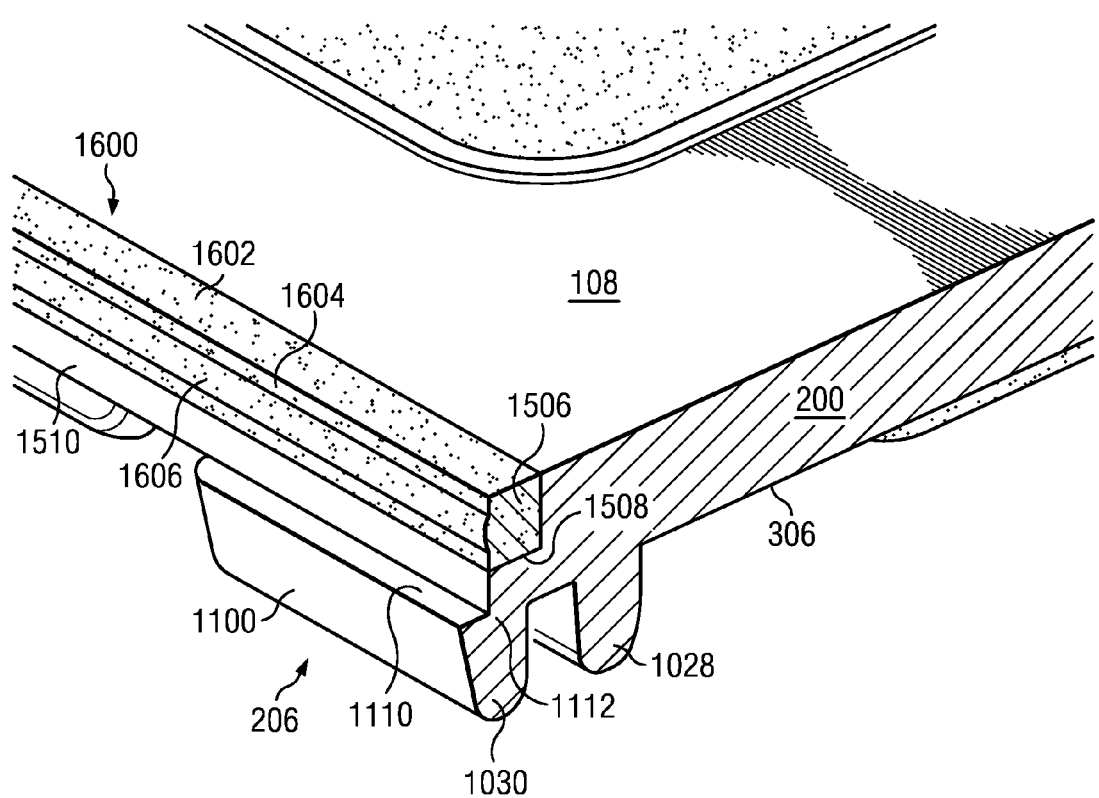
FIG. 17 is a magnified sectional detail through a lateral edge of the tile illustrated in FIG. 16.

FIG. 16 shows the view shown in FIG. 15, but after at least one overmolding step in which a peripheral seal 1600 has been overmolded into the steps 1518, 1520 to laterally surround the body 1500. The creation of the seal 1600 can take place during, before, or after the creation of the raised pads 106 and skins 304 (FIG. 9), and the seal 1600 can be constituted by a polymer compound which is the same as or which is different from the polymer compound constituting pads 106 and skins 304, in terms of composition, hardness, and/or color. It is preferred that the seal 1600 be constituted by a compound comprising SEBS TPE or other elastomeric compound.

A top surface 1602 of the seal 1600 is preferred to be coplanar with the general surface 108 of the body 1500. On one side of the tile body 1500, the horizontal surface 1602 extends from vertical surface 1506 laterally outwardly to a vertical surface 1604 of the seal. The vertical surface 1604 of the seal extends from seal horizontal surface 1602 until it meets with vertical surface 1510 of the body 1500, with which it is coplanar. As better seen in FIG. 17, the otherwise planar vertical surface 1604 is interrupted by a bump 1606 which is convex in section.

On an adjacent side of the body 1500, a horizontal surface 1608, which is continuous with the surface 1602 and preferably coplanar with upper surface 108 of body 1500, extends laterally outwardly from the lateral edge of vertical surface 1512 to a vertical surface 1610 of the seal 1600. The vertical surface 1610, which in general is orthogonal to surface 108 and planar, is interrupted by a convex bump 1612. Otherwise, surface 1610 meets and is coplanar with vertical surface 1516 of the body 1500. Surfaces 1604, 1610 form a ninety degree corner at their junction.

Figure 18:
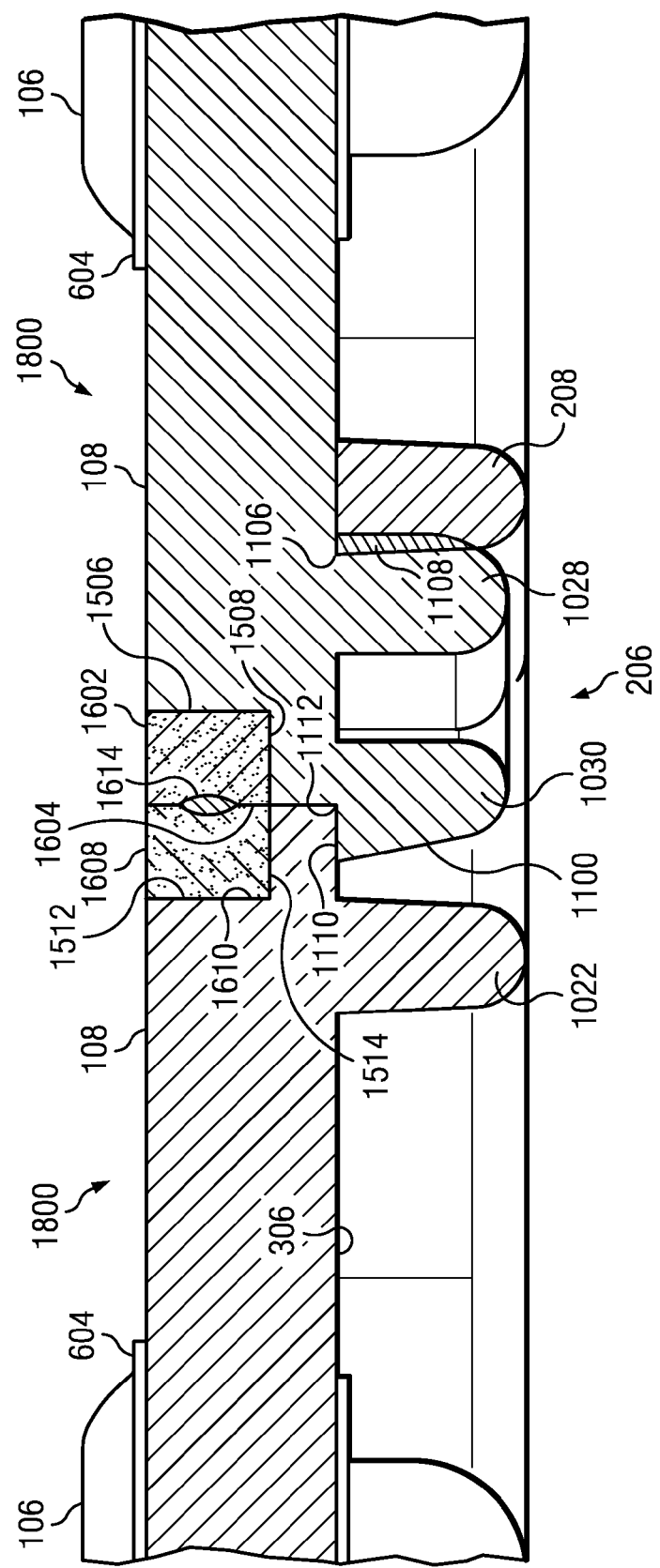
FIG. 18 is a magnified sectional detail showing joined lateral edges of adjacent tile, taken through two cooperating peripheral seals.

As shown in FIG. 18, when adjacent tiles 1800 are assembled such that a latch 206 is inserted into a loop 208, the bumps 1606, 1612 are in interference with each other, as shown by hatched interference region 1614. This creates a substantially watertight peripheral seal of each tile to the other tiles in the floor surface.

Figure 19:
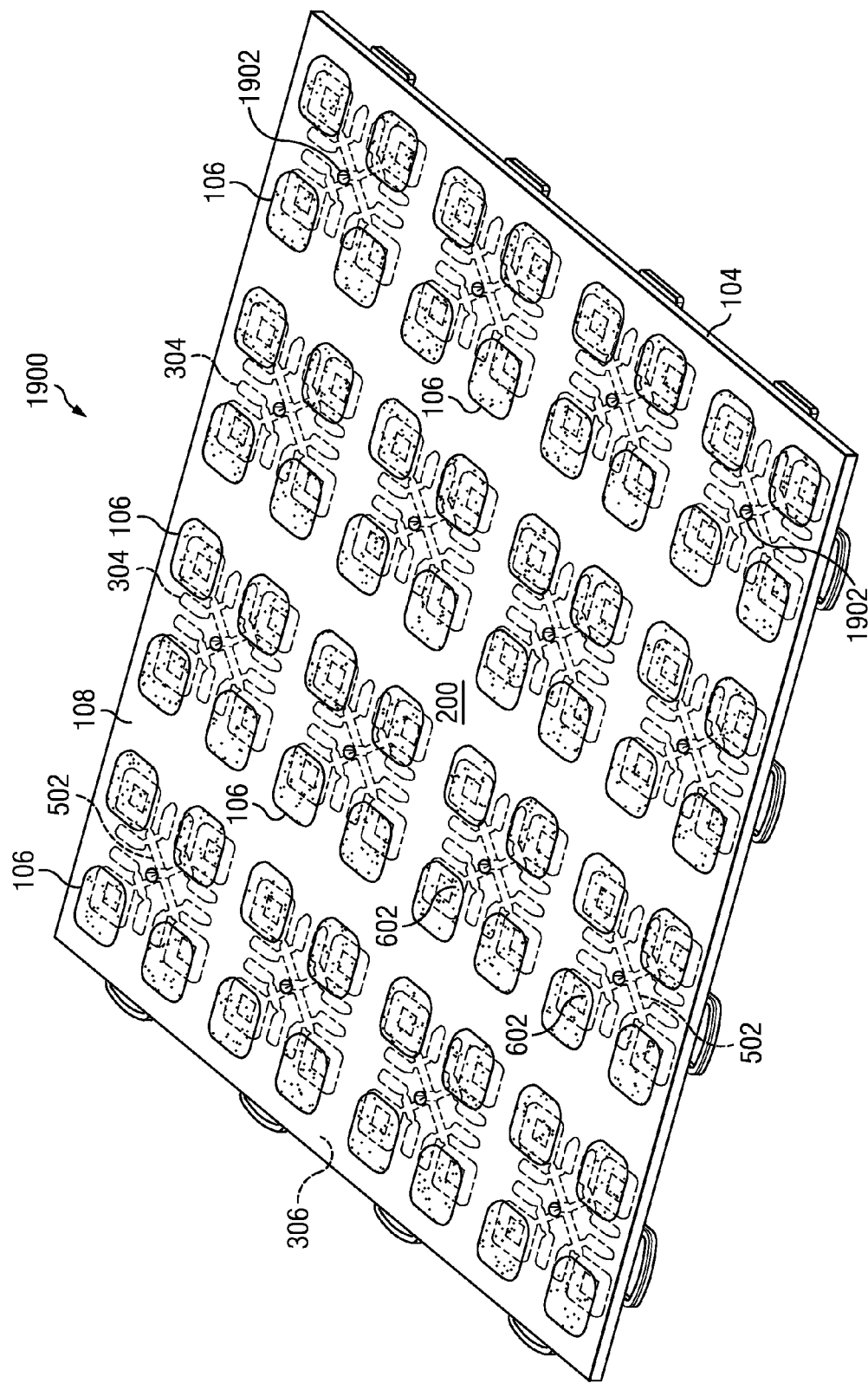
FIG. 19 is a schematic isometric view of a tile according to a third embodiment of the invention, wherein a second polymer compound is injected into a gate on an upper surface of the tile.

A further embodiment of the invention is shown in FIG. 19, in which certain structure adjacent the lower surface 306 of a tile 1900 is shown in phantom. This embodiment is similar to that shown in FIG. 2, with the difference that the second shot of polymer compound is introduced at upper surface 108 of the body 104, rather than at lower surface 306 thereof. For each of a group 300 of pads 106 and skins 304, a gate 1902 is formed to extend from the upper surface 108 of body 104 to the lower surface 306 thereof. The gate 1902 is continuous with runners 502 on the lower surface, which in turn communicate with the skins 304, the through-holes 602 and the cavities 600 in which are molded the pads 106. In making the second-shot injection, the second polymer compound flows through the gates 1902 to the lower surface 306, thence through runners 502 to the skins 304 and the through-holes 602, and finally back through the body 104 to the cavities 600 to mold the pads 106. In an alternative embodiment, the pads 106 are omitted and only structure adjacent lower surface 306 is molded, except for dots on the upper surface that result from the gates 1902.

Figure 20:
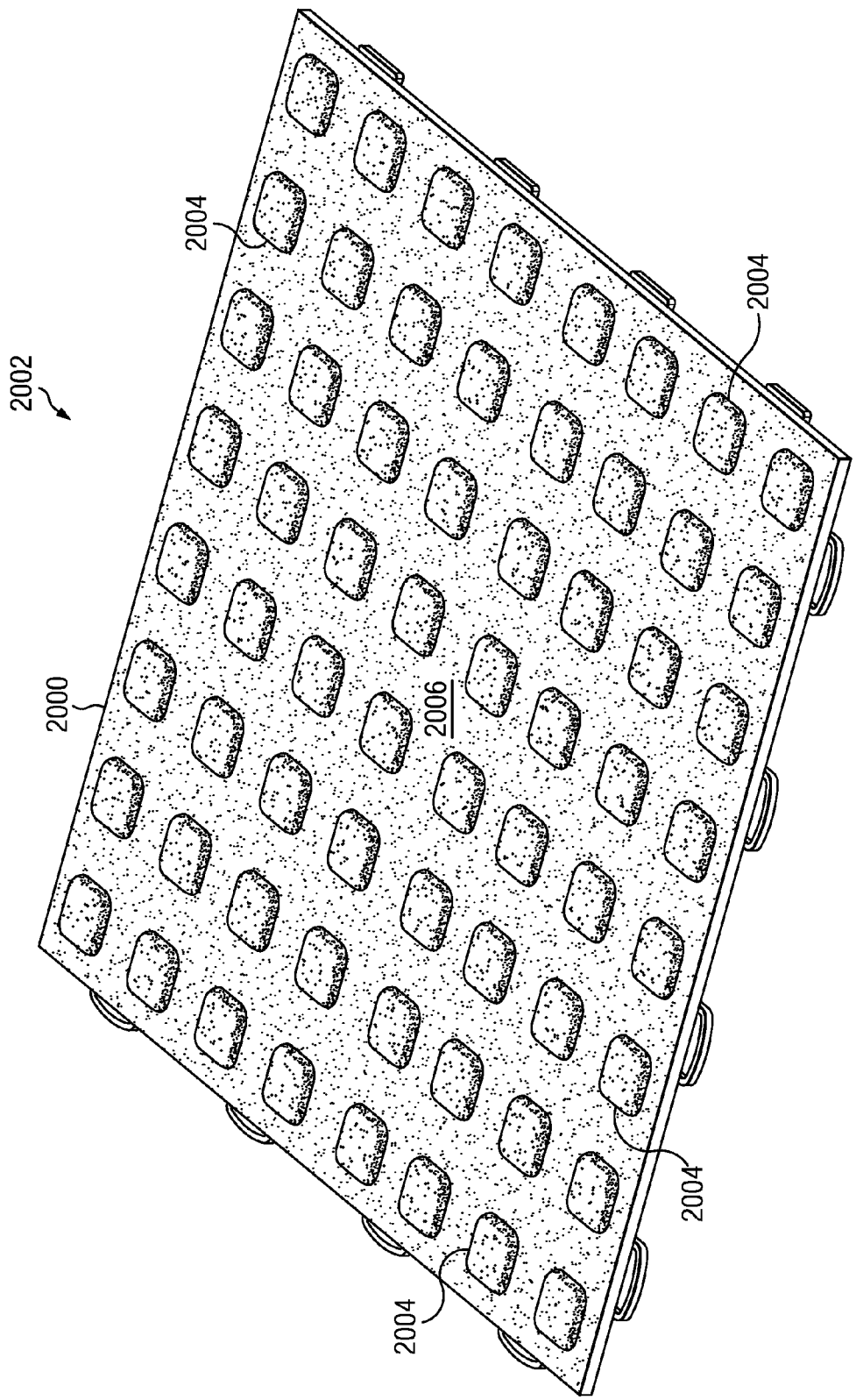
FIG. 20 is a top isometric view of a modular floor tile according to a fourth embodiment of the invention.

It is possible to overmold certain features on the bottom surface of the tile without creating raised pads from the second polymer compound on the top surface thereof. A top surface of such an embodiment can be seen in FIG. 20, in which the entire top surface 2000 of a tile 2002 is molded of the first polymer compound. While the top surface 2000 can be featureless except for texturing, in this illustrated embodiment an array of features 2004, which can be rounded squares or which can take any other desired shape, are upstanding from a general top surface 2006. A bottom surface of this illustrated embodiment can be exactly as it appears in FIGS. 3, 5, 10, 12 and 13. In this embodiment there are no through-holes or gates between the upper and lower surfaces of the tile 2002. This embodiment and the embodiment shown in FIGS. 1-13 can be made using much the same molding apparatus, by swapping out a cavity-side mold insert adjacent the top surface 108, 2000 and leaving a core side (adjacent the lower surface) alone. This illustrated embodiment will still exhibit non-slip properties relative to the substrate on which it is placed, may have better chemical and wear resistance, and may cost less to produce.

Considering together the embodiment illustrated by the combination of FIGS. 3 5, 10, 12, 13 and 20, raised features 2004 are more likely to receive a disproportionate amount of weight from a vehicle or other heavy object superimposed on the tile 2002. It is therefore preferred that some of the support members, such as members 800 (FIG. 8), receive all or some of the columnar load placed on any raised feature 2004. In the illustrated embodiment, each annular support member 800 (see FIG. 8) is in approximate registration with a respective raised feature 2004 and as such will militate against shearing between the boundary of the raised feature 2004 and the surrounding general surface 2006.

In summary, the present invention provides a modular floor tile that includes nonslip structures on its lower and upper surfaces. These structures are created by a two-shot injection molding or overmolding process in which a first polymer is used to provide the strength and rigidity needed to sustain a large load, and a second polymer is used to provide nonslip features. The second polymer may be colored differently than the first and this creates ornamental design opportunities that did not exist before. The modular tiles are fitted together using latches and loops wherein the loops hold adjacent tiles together under a biasing compression.

While embodiments of the present invention have been described in the above detailed description and illustrated in the appended drawings, the present invention is not limited thereto but only by the scope and spirit of the appended claims.

We claim:

1. A polymeric, injection-molded, modular floor tile for use in creating a flooring surface comprising a plurality of such tiles, the floor tile comprising:
   a body injection-molded from a first polymer compound and having an upper surface and a lower surface, the body having a plurality of spaced-apart through-holes extending from the lower surface to the upper surface;
   at least one fill point disposed adjacent the lower surface and laterally displaced from each of the through-holes, the fill point receiving a second polymer compound, the second polymer compound being elastomeric and being softer than the first polymer compound when both are solidified;
   a plurality of elongate runners injection-molded from the second polymer compound, each runner having an end located at the fill point and laterally extending along the lower surface of the body, each runner connected to any other of the plurality of runners only at the fill point, each runner joining the fill point to at least one respective through-hole, each through-hole connected to only one runner; and
   a plurality of pads injection-molded from the second polymer compound, each pad disposed on the upper surface of the body, laterally spaced from the fill point, and laterally spaced from the other pads, each pad located on top of a respective through-hole and joined to a runner by second polymer compound filling a respective through-hole, a lateral area of the through-hole at the upper surface of the body being a small fraction of a lateral area at the upper surface of the body of a respective pad, any of the plurality of pads connected to any other of the plurality of pads only by runners and through the fill point;
   wherein a majority of the lower surface of the body is not covered by second polymer compound.

2. The floor tile of claim 1, wherein a color of the first polymer compound is different from a color of the second polymer compound.

3. The floor tile of claim 1 wherein at least three through-holes are laterally spaced apart from each other in two directions, the fill point located centrally in respect of the through-holes.

4. The floor tile of claim 3, wherein at least four through-holes are laterally spaced apart from each other in two directions, the fill point located centrally in respect of the through-holes.

5. The floor tile of claim 3, wherein the fill point is at the geometric center of the through-holes.

6. The floor tile of claim 1, wherein a group is formed of a plurality of pads, each pad in the group connected by a respective runner to a common fill point for the group, a plurality of groups of pads disposed on the upper surface of the body, a plurality of common fill points disposed on the lower surface, each pad in each of said plurality of groups laterally displaced from a respective one of said plurality of common fill points.

7. The floor tile of claim 1, wherein the first polymer compound includes a polymer selected from the group consisting of polyolefins, thermoplastic polyurethane, acrylonitrile butadiene styrene and polyvinyl chloride.

8. The floor tile of claim 1, wherein the second polymer compound includes a polymer selected from the group consisting of styrene ethylene butylene styrene based thermoplastic elastomer, thermoplastic polyurethane and polyvinyl chloride.

9. The floor tile of claim 1, wherein the second polymer compound comprises a thermoplastic elastomer.

10. The floor tile of claim 1, wherein each of the runners connects to structures formed of the second polymer compound on the lower surface.

11. The floor tile of claim 1, wherein each of the runners is branched and connects to the structures formed of second polymer compound on the lower surface, the structures being laterally spaced from any of the through-holes.

* * * * *